United States Patent
Kuroda et al.

(10) Patent No.: US 10,199,836 B2
(45) Date of Patent: Feb. 5, 2019

(54) STORAGE BATTERY PACK, METHOD FOR CONTROLLING STORAGE BATTERY PACK, AND METHOD FOR CONTROLLING INFORMATION TERMINAL

(71) Applicant: PANASONIC INTELLECTUAL PROPERTY MANAGEMENT CO., LTD., Osaka (JP)

(72) Inventors: Go Kuroda, Osaka (JP); Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/009,346

(22) Filed: Jun. 15, 2018

(65) Prior Publication Data

US 2018/0294654 A1    Oct. 11, 2018

Related U.S. Application Data

(62) Division of application No. 15/074,904, filed on Mar. 18, 2016, now Pat. No. 10,027,132.

(30) Foreign Application Priority Data

Apr. 8, 2015   (JP) ................. 2015-078936

(51) Int. Cl.
*H02J 7/00* (2006.01)
*G06Q 10/00* (2012.01)
*G06Q 50/06* (2012.01)

(52) U.S. Cl.
CPC ............ *H02J 7/00* (2013.01); *G06Q 10/00* (2013.01); *G06Q 50/06* (2013.01); *H02J 7/0054* (2013.01);
(Continued)

(58) Field of Classification Search
CPC .............. H02J 7/00; H02J 2007/0096; H02J 2007/0098; H02J 13/00; H02J 50/80
(Continued)

(56) References Cited

U.S. PATENT DOCUMENTS

2006/0208850 A1   9/2006  Ikeuchi et al.
2011/0202910 A1*  8/2011  Venkatakrishnan ... G06Q 10/06
                                                              717/171
(Continued)

FOREIGN PATENT DOCUMENTS

WO    2014/155904    10/2014

*Primary Examiner* — Paul Dinh
(74) *Attorney, Agent, or Firm* — Greenblum & Bernstein, P.L.C.

(57) ABSTRACT

A method performed by an information terminal is provided. Profile information of an electrical device connected to a storage battery pack is received from the storage battery pack. The profile information includes device identification information of the electrical device and an item of state information indicating a state of the electrical device. A value of the item of state information of the electrical device is received from the storage battery pack. When a first instruction that causes the item of state information and the value of the item of state information to be displayed is received, a first display screen is displayed on the display of the information terminal. The first display screen depicts the item of state information and the value of the item of state information by using the received profile information and the received value of the item of state information.

11 Claims, 17 Drawing Sheets

(52) U.S. Cl.
CPC ..... *H02J 7/0004* (2013.01); *H02J 2007/0096* (2013.01)

(58) Field of Classification Search
USPC ........................................................ 320/112
See application file for complete search history.

(56) References Cited

U.S. PATENT DOCUMENTS

2013/0271009 A1\* 10/2013 Gerszberg .............. H05B 37/02
315/149
2015/0214758 A1 7/2015 Toya et al.
2016/0009334 A1\* 1/2016 Biderman ............... B60L 15/20
701/2
2017/0063111 A1 3/2017 Toya et al.

\* cited by examiner

FIG. 4

STORAGE BATTERY PACK

| ID | CONTENT | MINIMUM VALUE | MAXIMUM VALUE | SIZE | READ | WRITE | NOTIFY |
|---|---|---|---|---|---|---|---|
| 0 | REMAINING AMOUNT (%) | 0 | 100 | 8 BITS | ○ | × | × |
| 1 | ABNORMALITY FLAGS (SET OF ABNORMALITY FLAGS FOR EACH BIT) | — | — | 32 BITS | ○ | × | ○ |
| 2 | OUTPUT (W) | 0 | 500 | 16 BITS | ○ | ○ | × |
| .. | .. | .. | .. | .. | .. | .. | .. |

FIG. 5

ELECTRIC BICYCLE

| ID | CONTENT | MINIMUM VALUE | MAXIMUM VALUE | SIZE | READ | WRITE | NOTIFY |
|---|---|---|---|---|---|---|---|
| 0 | NUMBER OF PEDAL ROTATIONS (rpm) | 0 | 255 | 8 BITS | ○ | × | × |
| 1 | TOTAL TRAVEL DISTANCE (km) | 0 | 65535 | 16 BITS | ○ | × | × |
| .. | .. | .. | .. | .. | .. | .. | .. |

FIG. 14

STORAGE BATTERY PACK

| ID | CONTENT | MINIMUM VALUE | MAXIMUM VALUE | SIZE | READ | WRITE | NOTIFY |
|---|---|---|---|---|---|---|---|
| 0 | REMAINING AMOUNT (%) | 0 | 100 | 8 BITS | O | X | X |
| 1 | ABNORMALITY FLAGS | - | - | 32 BITS | O | X | O |
| 2 | OUTPUT (W) | 0 | 500 | 16 BITS | O | O | X |

FIG. 15

STORAGE BATTERY PACK

| ID | CONTENT | MINIMUM VALUE | MAXIMUM VALUE | SIZE | READ | WRITE | NOTIFY |
|---|---|---|---|---|---|---|---|
| 0 | REMAINING AMOUNT (%) | 0 | 100 | 8 BITS | O | X | X |
| 1 | ABNORMALITY FLAGS | - | - | 32 BITS | O | X | O |
| 2 | OUTPUT (W) | 0 | 500 | 16 BITS | O | O | X |
| 3 | TOTAL CAPACITY (mAh) | 0 | 65535 | 16 BITS | O | X | X |

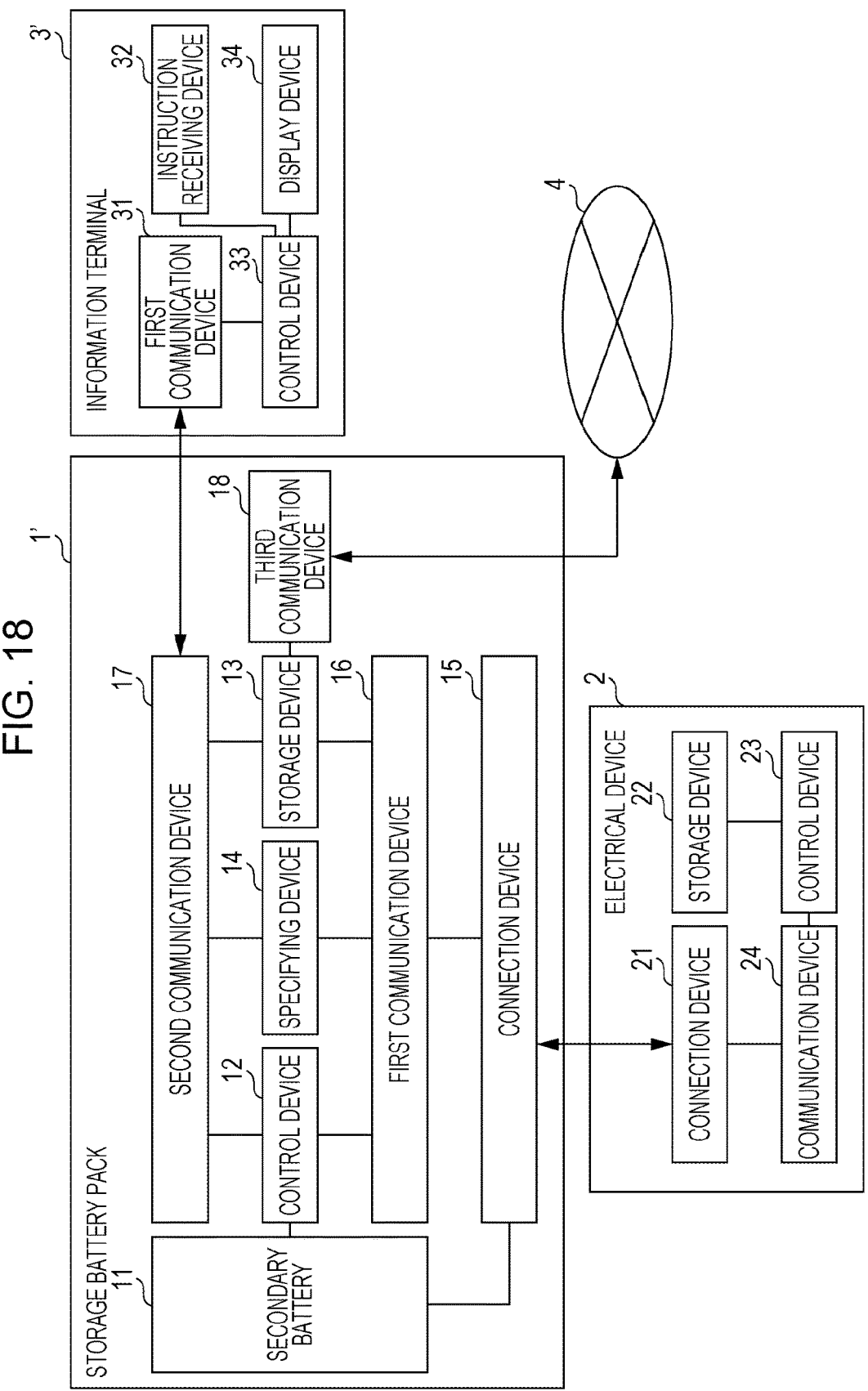

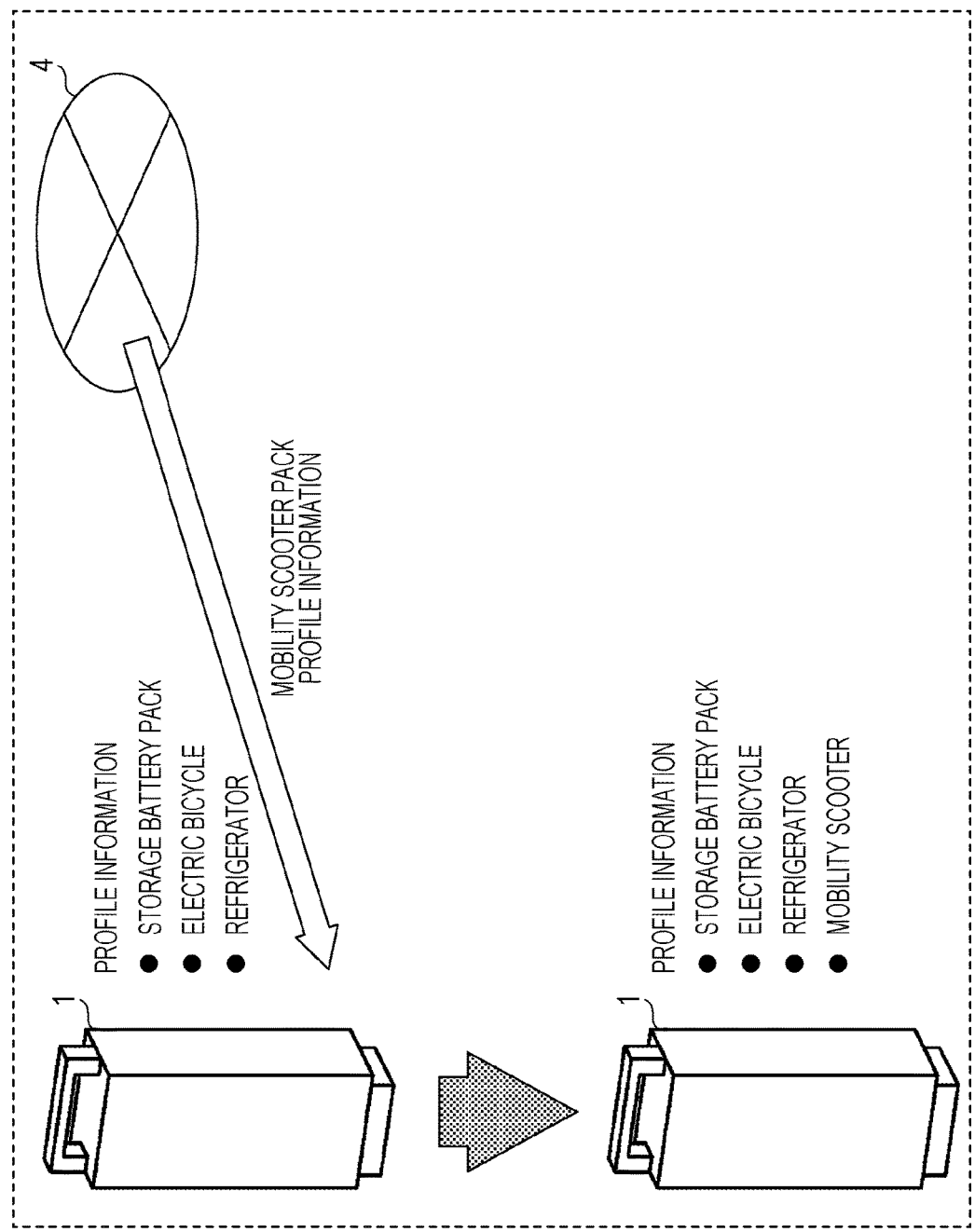

STORAGE BATTERY PACK, METHOD FOR CONTROLLING STORAGE BATTERY PACK, AND METHOD FOR CONTROLLING INFORMATION TERMINAL

CROSS REFERENCE TO RELATED APPLICATION

This application is a Divisional Application of U.S. application Ser. No. 15/074,904, filed Mar. 18, 2016 (now U.S. Pat. No. 10,027,132, issued Jul. 17, 2018), which claims priority to Japanese Patent Application No. 2015-078936, filed Apr. 8, 2015, the entire contents of which are hereby incorporated by reference.

BACKGROUND

1. Technical Field

The present disclosure relates to a storage battery pack that can be connected to a plurality of electrical devices and supplies power to a connected electrical device, a method for controlling a storage battery pack, and a method for controlling an information terminal communicably connected to a storage battery pack that can be connected to a plurality of electrical devices.

2. Description of the Related Art

A storage battery pack that is used being detachably connected to a plurality of types of external devices having different communication protocols is conventionally known (for example, see International Publication No. 2014/155904).

In the storage battery pack of International Publication No. 2014/155904, when an external device is connected to the storage battery pack, a communication protocol that enables communication with the external device is specified from among a plurality of communication protocols to establish communication, and once communication with the external device is established, discharging is performed from a secondary battery to the external device.

SUMMARY

However, in the conventional storage battery pack disclosed is International Publication No. 2014/155904, no consideration is given to the way in which information that indicates the state of the external electrical device to which the storage battery pack is connected is used between the storage battery pack and the device.

In the present disclosure, in light of the aforementioned situation, one non-limiting and exemplary embodiment provides a storage battery pack that can transmit information of an electrical device to an external information device via the storage battery pack even in the case where the electrical device does not have a function for communicating with the external information device.

In one general aspect, the techniques disclosed here feature a storage battery pack including: a secondary battery; a connector that is detachably connected to a plurality of electrical devices that operate with power of the secondary battery; a storage device that stores, for each of the plurality of electrical devices, profile information that is different for each of the plurality of the electrical devices, the profile information including device identification information that identifies the electrical device and an item of state information that indicates a state of the electrical device; a first communicator device that receives, from the electrical device connected to the connector, the device identification information and a value of the item of state information of the electrical device; a specifier that specifies the profile information corresponding to the electrical device connected to the connection device from among the plurality of items of profile information stored in the storage by using the device identification information of the electrical device connected to the connector; and a second communicator that transmits, to an external information device, the profile information specified by the specifying device and the value of the item of state information of the electrical device connected to the connector.

According to the present disclosure, it is possible for information of an electrical device to be transmitted to an external information device via a storage battery pack even in the case where the electrical device does not have a function for communicating with the external information device.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 4 is a drawing depicting an example of profile information of a storage battery pack in embodiment 1;

FIG. 5 is a drawing depicting an example of profile information of an electric bicycle in embodiment 1;

FIG. 14 is a drawing depicting an example of profile information of the storage battery pack stored in the storage battery pack;

FIG. 15 is a drawing depicting an example of profile information of the storage battery pack to which a new item of state information has been added;

FIG. 18 is a block diagram depicting a configuration of a storage battery pack, an electrical device, and an information terminal in embodiment 2; and FIG. 19 is a schematic drawing for describing processing for adding new profile information to the storage battery pack in embodiment 2.

DETAILED DESCRIPTION

Figure 1:
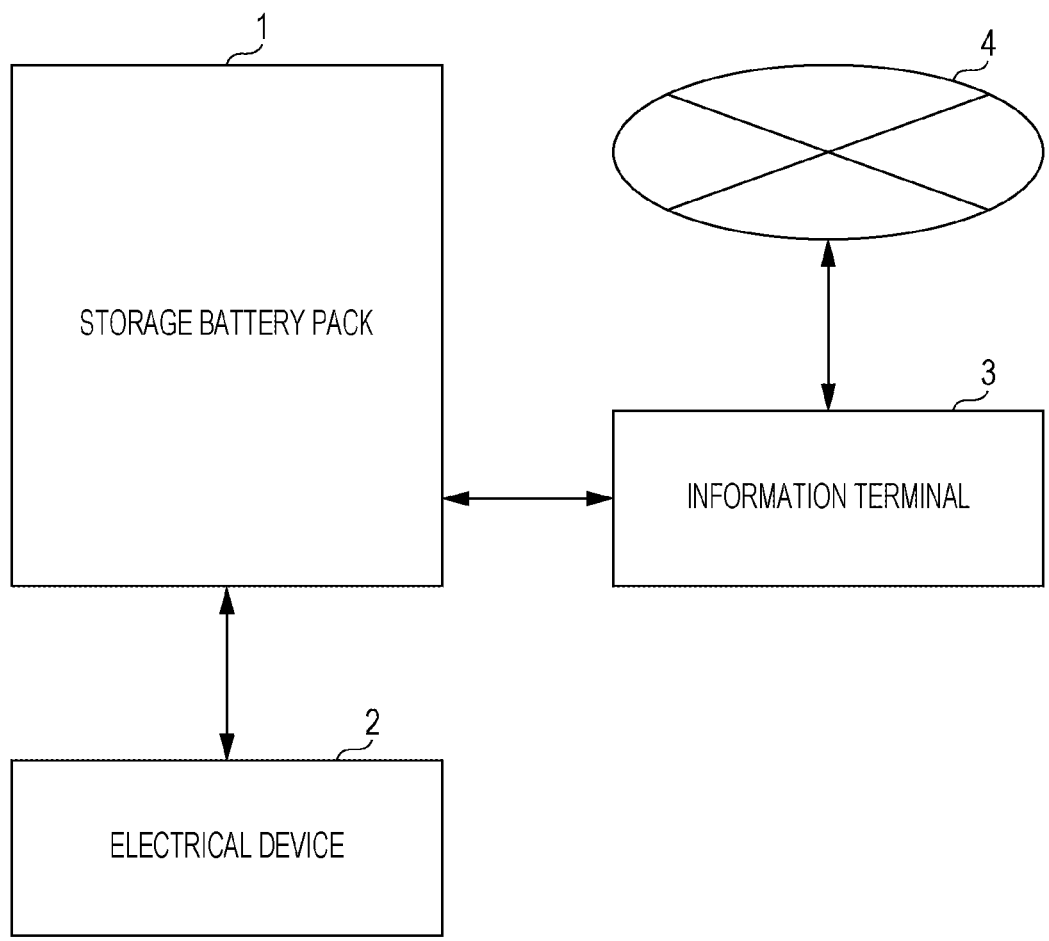
FIG. 1 is a drawing depicting a configuration of an information processing system in embodiment 1.

Hereinafter, embodiments of the present disclosure will be described with reference to the appended drawings. It should be noted that the embodiments hereinafter are exemplary embodiments of the present disclosure, and do not limit the technical scope of the present disclosure.

A first mode of the present disclosure provides a storage battery pack including: a secondary battery; a connector that is detachably connected to a plurality of electrical devices that operate with power of the secondary battery; a storage that stores, for each of the plurality of electrical devices, profile information that is different for each of the plurality of the electrical devices, the profile information including device identification information that identifies the electrical device and an item of state information that indicates a state of the electrical device; a first communicator that receives, from the electrical device connected to the connector, the device identification information and a value of the item of state information of the electrical device; a specifier that specifies the profile information corresponding to the electrical device connected to the connection device from among a plurality of items of profile information stored in the storage by using the device identification information of the electrical device connected to the connector; and a second communicator that transmits, to an external information device, the profile information specified by the specifying device and the value of the item of state information of the electrical device connected to the connector.

According to this configuration, a connector is detachably connected to a plurality of electrical devices. Profile information that is different for each of the plurality of the electrical devices, the profile information including device identification information that identifies the electrical devices and an item of state information that indicates the state of the electrical device, is stored in a storage for each of the plurality of electrical devices. The value of the item of state information are then received from the electrical device. Furthermore, profile information corresponding to an electrical device connected to the connection device is specified from among the plurality of item of profile information stored in the storage device. The specified profile information is transmitted.

Consequently, profile information that is different for each of the plurality of electrical devices, the profile information including device identification information that identifies the electrical devices and item of state information that indicates the state of the electrical device, is stored in the storage battery pack, which is connected to an electrical device, the value of the item of state information are received from the electrical device, and, from among the plurality of item of profile information, the profile information corresponding to the connected electrical device and the value of the item of state information are transmitted. Therefore, information of the electrical device can be transmitted to an external information device via the storage battery pack even in the case where the electrical device does not have a function for communicating with the external information device.

Furthermore, a second mode of the present disclosure provides a storage battery pack in which, in the aforementioned first mode, the external information device is an information terminal, and the second communicator transmits the profile information specified by the specifier to the information terminal.

According to this configuration, the specified profile information is transmitted to the information terminal. Consequently, information of the electrical device to which the storage battery pack is connected can be transmitted to the information terminal, and the user can use the information terminal to confirm the information of the electrical device.

Furthermore, a third mode of the present disclosure provides a storage battery pack in which, in the aforementioned second mode, the second communication device receives, from the information terminal, instruction information that instructs operation of the electrical device, the instruction information causing the value of the item of state information corresponding to the item of state information included in the profile information to change, and the first communicator transmits the instruction information received by the second communicator to the electrical device.

According to this configuration, instruction information that instructs operation of the electrical device, the instruction information causing the value of the item of state information included in the profile information to change, is received from the information terminal. The received instruction information is then transmitted to the electrical device. Consequently, operation of the electrical device can be controlled remotely via the storage battery pack.

Furthermore, a fourth mode of the present disclosure provides a storage battery pack in which, in any one of the aforementioned first to third modes, the first communicator communicates with the electrical device via the connector in a wired manner. According to this configuration, communication can be performed with the electrical device via the connection device in a wired manner.

Furthermore, a fifth mode of the present disclosure provides a storage battery pack in which, in any one of the aforementioned first to fourth modes, the storage stores the profile information, in which each of the plurality of electrical devices and the item of state information are associated, in a table format, the first communication device receives the device identification information from the electrical device, and the specifier refers to the profile information and uses the device identification information received by the first communicator to specify the profile information corresponding to the electrical device connected to the connection device.

According to this configuration, the storage stores the profile information, in which each of the plurality of electrical devices and the item of state information are associated, in a table format. Device identification information is received from an electrical device. Reference is made to the profile information, and the received device identification information is used for the profile information corresponding to the electrical device connected to the connector to be specified.

Consequently, since the profile information is stored in a table format, the profile information corresponding to the electrical device connected to the connector can be easily specified.

Furthermore, a sixth mode of the present disclosure provides a storage battery pack in which, in the aforementioned second mode, the second communicator receives, from the information terminal, newly defined profile information that corresponds to an electrical device and is not stored in the storage device, and adds the received profile information to the storage device.

According to this configuration, newly defined profile information that corresponds to an electrical device and is not stored in the storage is received from the information terminal, and the received profile information is added to the storage.

Consequently, newly defined profile information that corresponds to an electrical device can be added to the electrical device via the storage battery pack connected to the electrical device.

Furthermore, a seventh mode of the present disclosure provides a storage battery pack that, in the aforementioned second mode, is further provided with a third communicator that communicates with the external information device via an external network, the third communicator receiving, from the external information device, newly defined profile information that corresponds to an electrical device and is not stored in the storage device, and adding the received profile information to the storage device.

According to this configuration, communication is performed with an external information device via an external network. Newly defined profile information that corresponds to an electrical device and is not stored in the storage is then received from the external information device, and the received profile information is added to the storage.

Consequently, newly defined profile information that corresponds to an electrical device can be added to the electrical device from the external information device via the external network.

Furthermore, an eighth mode of the present disclosure provides a storage battery pack that, in the aforementioned sixth or seventh mode, further comprises a comparator that compares the item of state information included in the received profile information with the item of state information included in the profile information that corresponds to the same electrical device as the received profile information and is stored in the storage device, and, in the case where it is determined that an item of state information included in the received profile information is not present in the profile information stored in the storage, adds the item of state information included in the received profile information to the profile information stored in the storage device.

According to this configuration, the item of state information included in the received profile information and the item of state information included in the profile information that corresponds to the same electrical device as the received profile information and is stored in the storage device are compared. Then, in the case where it is determined that an item of state information included in the received profile information is not present in the profile information stored in the storage, the item of state information included in the received profile information is added to the profile information stored in the storage device.

Consequently, in the case where it is determined that an item of state information included in the received profile information is not present in the profile information stored in the storage, since it is possible for the item of state information included in the received profile information to be added to the profile information stored in the storage, the profile information can be updated.

Furthermore, a ninth mode of the present disclosure provides a storage battery pack in which, in the aforementioned second mode, the second communicator does not transmit, to the information terminal, profile information other than the profile information specified by the specifier from among the plurality of items of profile information stored in the storage.

According to this configuration, profile information other than the specified profile information from among the plurality of items of profile information stored in the storage device is not transmitted to the information terminal. Consequently, the profile information of an electrical device to which the storage battery pack is not connected is not transmitted and only the profile information of the electrical device to which the storage battery pack is connected is transmitted. Therefore, unnecessary information is not transmitted to the information terminal, the amount of data required for communication can be reduced, and also the processing time required for communication can be shortened.

A tenth mode of the present disclosure provides a method including: storing, in a storage provided in the storage battery pack, profile information that is different for each of a plurality of electrical devices, the profile information including device identification information that identifies the electrical devices and an item of state information that indicates a state of the electrical devices; receiving the device identification information and a value of the item of state information of the electrical device connected to the storage battery pack via a connector provided in the storage battery pack, from the electrical device via a first communicator provided in the storage battery pack; specifying the profile information corresponding to the electrical device connected to the connection device from among the plurality of items of profile information stored in the storage device by using the device identification information of the electrical device connected to the connector; and transmitting, to an external information device, the specified profile information and the value of the item of state information.

According to this configuration, profile information that is different for each of a plurality of electrical devices, the profile information including device identification information that identifies the electrical device and item of state information, is stored in a storage device for each of the plurality of electrical devices. The value of the item of state information of an electrical device connected to the storage battery pack via a connector is then received from the electrical device. Furthermore, profile information corresponding to the electrical device connected to the connection device is specified from among the plurality of items of profile information stored in the storage device. The specified profile information and the value of the item of state information are transmitted to an external information device.

Consequently, profile information that is different for each of the plurality of electrical devices, the profile information including device identification information that identifies the electrical devices and the item of state information that indicates the state of the electrical device, is stored in a storage battery pack connected to an electrical device, the value of the item of state information is received from the electrical device, and the profile information corresponding to the connected electrical device from among the plurality of items of profile information and the value of the item of state information are transmitted. Therefore, information of the electrical device can be transmitted to the external information device via the storage battery pack even when the electrical device does not have a function for communicating with the external information device.

An eleventh mode of the present disclosure provides a method including: receiving profile information of an electrical device connected to a storage battery pack by an information terminal, the profile information including device identification information of the electrical device and an item of state information that indicates a state of the electrical device, from the storage battery pack by the information terminal; receiving a value of the item of state information of the electrical device connected to the storage battery pack, from the storage battery pack by the information terminal; and, when a first instruction that causes the items of state information that indicates the state of the electrical device connected to the storage battery pack and the value of the item of state information to be displayed on a display is received, displaying, on the display of the information terminal, a first display screen that depicts the items of state information that indicates the state of the electrical device and the values of the items of state information by using the profile information and the values of the items of state information received.

According to this configuration, a first instruction is received that causes profile information, which includes device identification information that identifies an electrical device connected to a storage battery pack and item of state information that indicate the state of the electrical device, and the value of the item of state information to be displayed on a display of an information terminal. The profile information and the value of the item of state information are received from the storage battery pack. The profile information and the value of the item of state information received are used to display, on the display of the information terminal, a first display screen that depicts the items of state information that indicate the state of the electrical device and the value of the item of state information.

Consequently, the user can confirm the item of state information that indicate the state of the electrical device connected to the storage battery pack and the value of the item of state information. Furthermore, the profile information of the electrical device and the value of the item of state information can be acquired from the storage battery pack rather than from the electrical device.

Furthermore, a twelfth mode of the present disclosure provides a method in which, in the aforementioned eleventh mode, when a second instruction that causes information indicating the storage battery pack to be displayed on the display of the information terminal is received, a second display screen depicting the information indicating the storage battery pack is displayed on the display. According to this configuration, a second display screen depicting information indicating the storage battery pack is displayed on the display of the information terminal, and therefore the user is able to confirm the information indicating the storage battery pack.

Furthermore, a thirteenth mode of the present disclosure provides a method in which, in the aforementioned twelfth mode, the information indicating the storage battery pack and information indicating the electrical device to which the storage battery pack is connected are associated and displayed on the second display screen.

According to this configuration, information indicating the storage battery pack and information indicating the electrical device to which the storage battery pack is connected are associated and displayed on the second display screen, and therefore the user is able to easily confirm the storage battery pack and the electrical device to which the storage battery pack is connected.

Furthermore, a fourteenth mode of the present disclosure provides a method in which, in the aforementioned thirteenth mode, information indicating a storage battery pack that is not connected to an electrical device is displayed on the second display screen.

According to this configuration, information indicating a storage battery pack that is not connected to an electrical device is displayed on the second display screen, and therefore the user is able to easily confirm a storage battery pack that is not connected to an electrical device.

Furthermore, a fifteenth mode of the present disclosure provides a method in which, in the aforementioned thirteenth mode, on the second display screen, information indicating a storage battery pack that is not registered as a user in the information terminal is displayed, and information indicating an electrical device that is connected to the unregistered storage battery pack is not displayed.

According to this configuration, on the second display screen, information indicating a storage battery pack that is not registered as a user in the information terminal is displayed, and information indicating an electrical device that is connected to the unregistered storage battery pack is not displayed. Consequently, the type of connected electrical device is not displayed for a storage battery pack that is not registered as a user in the information terminal, and therefore the user is able to confirm only electrical devices that are connected to storage battery packs that are registered as users.

Furthermore, a sixteenth mode of the present disclosure provides a method in which, in the aforementioned thirteenth mode, the first instruction is received as a result of the information that indicates the electrical device displayed on the second display screen being selected.

According to this configuration, the first instruction is received as a result of the information that indicates the electrical device and is displayed on the second display screen being selected, and therefore the user is able to easily select an electrical device for which profile information is easily displayed on the display of the information terminal.

Furthermore, a seventeenth mode of the present disclosure provides a method in which, in any one of the aforementioned eleventh to sixteenth modes, a selection of the electrical device to be operated is received, and, when a third instruction that instructs operation of the electrical device, which causes the value of the item of state information of the selected electrical device to change, is received, the third instruction is transmitted to the storage battery pack to which the electrical device is connected.

According to this configuration, a selection of the electrical device to be operated is received. A third instruction that instructs operation of the electrical device, which causes the value of the item of state information of the selected electrical device to change, is received. The third instruction is then transmitted to the storage battery pack to which the electrical device is connected. Consequently, operation of the electrical device can be controlled remotely via the storage battery pack.

(Embodiment 1)

FIG. 1 is a drawing depicting a configuration of an information processing system in the present embodiment 1. The information processing system depicted in FIG. 1 is provided with a storage battery pack 1, an electrical device 2, and an information terminal 3.

The storage battery pack 1 can be connected to a plurality of different types of electrical devices 2, and supplies power to a connected electrical device 2.

The electrical device 2 is a washing machine, a refrigerator, a vacuum cleaner, an automobile, a bicycle, or the like, and it can be said that these are mutually different types of electrical devices 2. The electrical device 2 operates by using power supplied from the storage battery pack 1.

The information terminal 3 is a smartphone, a personal computer, a tablet computer, a cellular phone, or the like. The information terminal 3 is connected to the storage battery pack 1 via a wireless local area network (LAN), short-distance wireless communication (near field communication), or Bluetooth (registered trademark), for example. It should be noted that the information terminal 3 may be connected in a wired manner to the storage battery pack 1. Furthermore, the information terminal 3 is connected to an external information device such as a server via an external network 4 such as a cellular phone communication network or the Internet.

Figure 2:
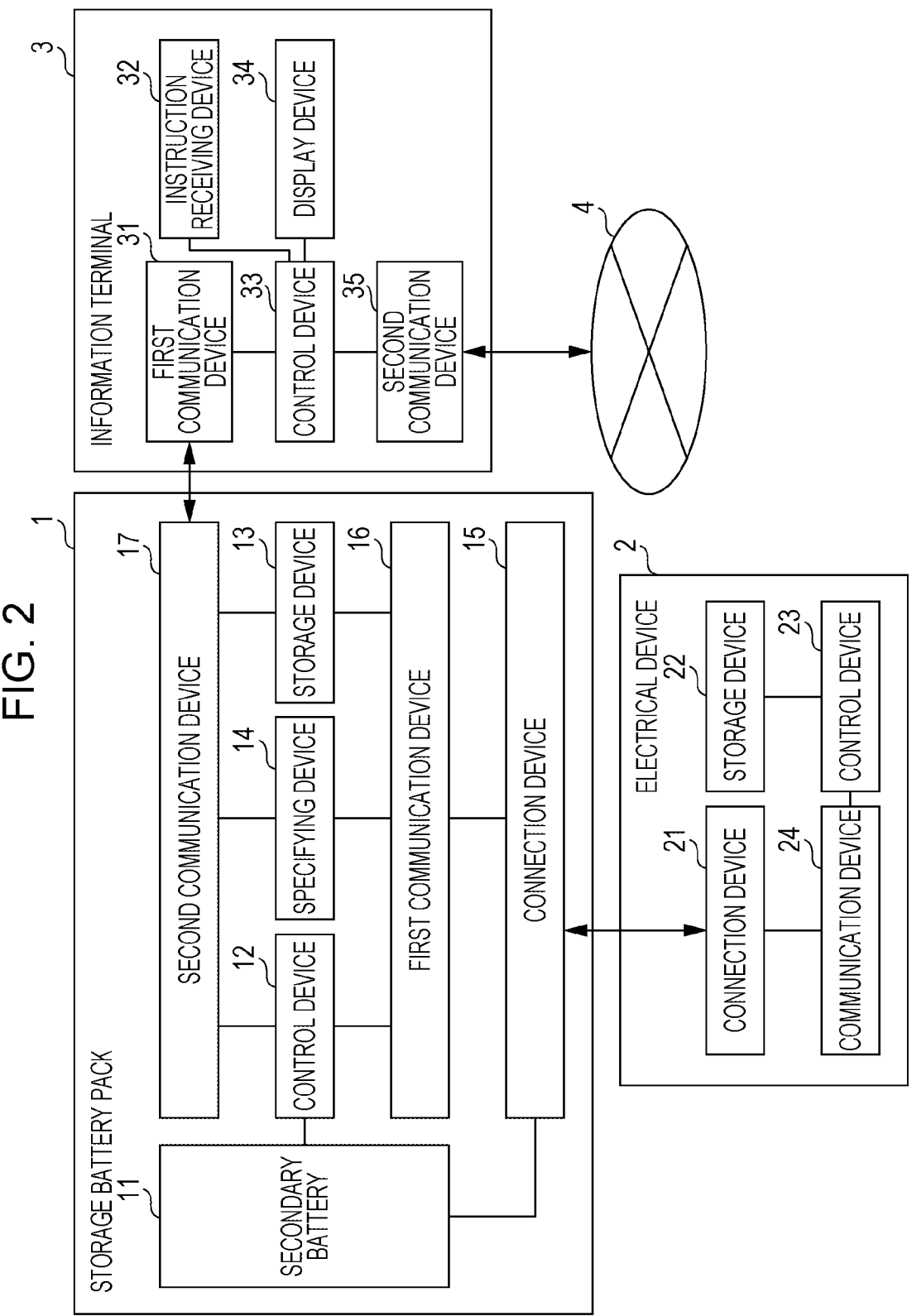
FIG. 2 is a block diagram depicting a configuration of a storage battery pack, an electrical device, and an information terminal in embodiment 1.

FIG. 2 is a block diagram depicting a configuration of the storage battery pack, the electrical device, and the information terminal in the present embodiment 1.

The storage battery pack 1 depicted in FIG. 2 is provided with a secondary battery 11, a control device 12, a storage device 13, a specifying device 14, a connection device 15, a first communication device 16, and a second communication device 17. The connection device 15 is an example of a connection device of the present disclosure. The storage device 13 is an example of a storage device of the present disclosure. The first communication device 16 is an example of a first communication device of the present disclosure. The specifying device 14 is an example of a specifying device of the present disclosure. The second communication device 17 is an example of a second communication device of the present disclosure.

The secondary battery 11 is constituted by a lithium-ion secondary battery, for example, and stores electricity.

A device provided with a control function is sufficient for the control device 12, which is provided with a computation processing unit (not depicted) and a storage unit (not depicted) that stores a control program. An example of the computation processing unit is a microprocessing unit (MPU) or a central processing unit (CPU), and an example of the storage unit is a memory. The control device 12 may be constituted by an individual control device that performs centralized control, or may be constituted by a plurality of control devices that cooperate with each other to perform distributed control.

The storage device 13 stores, for each of a plurality of electrical devices 2, profile information that is different for each of the plurality of the electrical devices 2, including device identification information that identifies the electrical devices 2 and items of state information indicating the states of the electrical devices 2. Furthermore, the storage device 13 may store profile information that includes device identification information that identifies the storage battery pack 1 and items of state information that indicate the state of the storage battery pack 1. It should be noted that the storage device 13 may be constituted by a plurality of storage devices or may be constituted by an individual storage device. Furthermore, the storage device 13 may also be used as a storage unit (not depicted) for the control device 12. Furthermore, the device identification information that identifies the electrical devices 2 may be any of information indicating the types of the electrical devices 2, information indicating product numbers of the electrical devices 2, and information indicating product names of the electrical devices 2.

The specifying device 14 specifies profile information corresponding to the electrical device 2 connected to the connection device 15, from among a plurality of items of profile information stored in the storage device 13. Specifically, the device identification information that identifies the electrical device 2 received from the electrical device 2 is used to specify the profile information corresponding to the electrical device 2 connected to the connection device 15, from among the plurality of items of profile information. For example, the specifying device 14 specifies profile information having the same device identification information as the received device identification information of the electrical device 2, as the profile information corresponding to the electrical device 2 connected to the connection device 15. The specifying device 14 may also be used for the control device 12.

The connection device 15 is a connection terminal for connecting to the electrical device 2. The connection device 15 detachably connects to the electrical device 2. When the secondary battery 11 is discharged, power is supplied to the electrical device 2 via the connection device 15. Furthermore, when the secondary battery 11 is charged, power is supplied from an external power source (not depicted) via the connection device 15. It should be noted that in the case where the electrical device 2 is provided with a charging function, power is supplied from the electrical device 2 via the connection device 15.

The first communication device 16 communicates with the electrical device 2 via the connection device 15 in a wired manner. The first communication device 16 receives the device identification information that identifies the electrical device 2. The specifying device 14 specifies profile information corresponding to the device identification information received by the first communication device 16, from among the plurality of items of profile information stored in the storage device 13. Furthermore, the first communication device 16 receives values of items of state information from the electrical device 2.

Here, a value of an item of state information is defined as a value of the electrical device 2 that corresponds to an item of state information. Specifically, as an example, when the electrical device 2 is an electric bicycle, an item of state information may be the speed of the electric bicycle, and the value of the item of state information may be the value of the speed of the electric bicycle. It should be noted that the profile information and the values of the items of state information may be stored together in the same storage device within the storage device 13, or may be stored in different storage devices. For example, when the storage device 13 is provided with a read only memory (ROM) and a random access memory (RAM), the profile information may be retained in the ROM and the values of the items of state information may be retained in the RAM, or the profile information and the values of the items of state information may be retained in the ROM. It should be noted that data in which items of state information and the values of the items of state information are associated may be retained in the same storage device.

The second communication device 17 communicates with the information terminal 3 in a wired or wireless manner. The second communication device 17 transmits the profile information of the electrical device 2 specified by the specifying device 14 to the information terminal 3. Furthermore, the second communication device 17 may transmit the profile information of the storage battery pack 1 stored in the storage device 13 to the information terminal 3. Furthermore, the second communication device 17 may associate the profile information of the electrical device 2 specified by the specifying device 14, and the values of the items of state information of the electrical device 2 received by the first communication device 16, and transmit such to the information terminal 3. Furthermore, the second communication device 17 may associate the profile information of the storage battery pack 1 stored in the storage device 13, and the values of the items of state information of the storage battery pack 1, and transmit such to the information terminal 3. It should be noted that, when associating the profile information of the electrical device 2 and the values of the items of state information, specifically, items of state information and values of the items of state information are associated from within the profile information. Furthermore, the second communication device 17 receives, from the information terminal 3, instruction information that instructs operation of the electrical device 2, which causes the values of the items of state information included in the profile information to change. The first communication device 16 transmits the instruction information received by the second communication device 17 to the electrical device 2.

The second communication device 17 receives, from the information terminal 3, profile information corresponding to the electrical device 2 that is not stored in the storage device 13, and stores the received profile information in the storage device 13. Furthermore, the control device 12 compares the items of state information included in the profile information received from the information terminal 3, and the items of state information included in the profile information that corresponds to the same electrical device 2 as the received profile information and is stored in the storage device 13. In the case where it is determined that an item of state information included in the received profile information is not present in the profile information stored in the storage device 13, the control device 12 adds the item of state information included in the received profile information to the profile information stored in the storage device 13.

Furthermore, the second communication device 17 does not transmit, to the information terminal 3, profile information other than the profile information specified by the specifying device 14 from among the plurality of items of profile information stored in the storage device 13. In the aforementioned, the second communication device 17 transmits and receives information including profile information with the information terminal 3, which is an external information device; however, it should be noted that this is an example. The second communication device 17 may transmit and receive information including profile information such as the aforementioned with a server, which is another information device. This point also applies to the description hereinafter.

The electrical device 2 depicted in FIG. 2 is provided with a connection device 21, a storage device 22, a control device 23, and a communication device 24.

The connection device 21 is a connection terminal for connecting to the storage battery pack 1. The connection device 21 detachably connects to the storage battery pack 1.

The storage device 22 stores device identification information that identifies the electrical device 2, items of state information that identify the state of the electrical device 2, and values of the items of state information.

A device provided with a control function is sufficient for the control device 23, which is provided with a computation processing unit (not depicted) and a storage unit (not depicted) that stores a control program. An example of the computation processing unit is an MPU or a CPU, and an example of the storage unit is a memory. The control device 23 may be constituted by an individual control device that performs centralized control, or may be constituted by a plurality of control devices that cooperate with each other to perform distributed control. It should be noted that the storage device 22 may be constituted by a plurality of storage devices or may be constituted by an individual storage device. Furthermore, the storage device 22 may also be used as a storage unit (not depicted) for the control device 23.

The communication device 24 communicates with the storage battery pack 1 via the connection device 21 in a wired manner. The communication device 24 transmits device identification information that identifies the electrical device 2 to the storage battery pack 1. Furthermore, the communication device 24 transmits the values of the items of state information of the electrical device 2 to the storage battery pack 1. Furthermore, the communication device 24 receives, from the storage battery pack 1, instruction information that instructs operation of the electrical device 2, which causes the values of the items of state information included in the profile information to change. It should be noted that the communication device 24 may also be wireless. In such a case, the communication device 24 is able to communicate with the first communication device 16 of the storage battery pack 1 but is not able to communicate with a first communication device 31 of the information terminal 3, which is an external information device, with a server, or the like. The control device 23 causes the electrical device 2 to operate in accordance with the instruction information received by the communication device 24. If the values of the items of state information change as a result of causing the electrical device 2 to operate, the control device 23 changes the values of the items of state information stored in the storage device 22.

It should be noted that the configuration of the electrical device 2 is not limited to only the connection device 21, the storage device 22, the control device 23, and the communication device 24. The electrical device 2 is additionally provided with a configuration for realizing the original function of the device.

The information terminal 3 depicted in FIG. 2 is provided with the first communication device 31, an instruction receiving device 32, a control device 33, a display device 34, and a second communication device 35.

The first communication device 31 communicates with the storage battery pack 1 in a wired or wireless manner. The first communication device 31 receives the profile information corresponding to the electrical device 2 connected to the storage battery pack 1, from the storage battery pack 1. Furthermore, the first communication device 31 may receive the profile information of the storage battery pack 1 from the storage battery pack 1. Furthermore, the first communication device 31 may receive the values of the items of state information associated with the profile information of the electrical device 2 connected to the storage battery pack 1, from the storage battery pack 1. Furthermore, the first communication device 31 may receive the values of the items of state information associated with the profile information of the storage battery pack 1, from the storage battery pack 1. It should be noted that, when associating the profile information of the electrical device 2 and the values of the items of state information, specifically, items of state information and values of the items of state information are associated from within the profile information.

The instruction receiving device 32 is constituted by a touch panel, a keyboard, a mouse, or a button, for example, and receives an input instruction performed by the user. The instruction receiving device 32 receives a second instruction that causes information indicating the storage battery pack 1 to be displayed on the display device 34. Furthermore, the instruction receiving device 32 receives a first instruction that causes items of state information indicating the state of the electrical device 2 and the values of the items of state information to be displayed on the display device 34. It should be noted that the first instruction may include an instruction the causes the items of state information indicating the state of the storage battery pack 1 and the values of the items of state information to be displayed on the display device 34. In other words, the instruction receiving device 32 may receive a first instruction that causes the display of at least one of: the items of state information of the electrical device 2 connected to the storage battery pack 1 and the values of the items of state information; and the items of state information of the storage battery pack 1 and the values of the items of state information.

Furthermore, the instruction receiving device 32 receives the selection of the electrical device 2 to be operated. The instruction receiving device 32 receives a third instruction that instructs operation of the electrical device 2, which causes the values of the items of state information corresponding to the selected electrical device to change. The first communication device 31 transmits the third instruction to the storage battery pack 1 to which the electrical device 2 is connected.

A device provided with a control function is sufficient for the control device 33, which is provided with a computation processing unit (not depicted) and a storage unit (not depicted) that stores a control program. An example of the computation processing unit is an MPU or a CPU, and an example of the storage unit is a memory. The control device 33 may be constituted by an individual control device that performs centralized control, or may be constituted by a plurality of control devices that cooperate with each other to perform distributed control.

When the second instruction is received, the control device 33 causes a second display screen to be displayed on the display device 34, the second display screen depicting information indicating the storage battery pack 1. Furthermore, when the first instruction is received, the control device 33 causes a first display screen to be displayed on the display device 34, the first display screen depicting the items of state information of the electrical device 2 and the values of the items of state information.

The display device 34 displays the second display screen that depicts the information indicating the storage battery pack 1. Furthermore, the display device 34 displays the first display screen that depicts the items of state information of the electrical device 2 and the values of the items of state information. Furthermore, the display device 34 may display a first display screen that depicts the items of state information of the storage battery pack 1 and the values of the items of state information.

The second communication device 35 communicates with an external information device (not depicted) such as a server via the external network 4. The second communication device 35 communicates with the external information device in a wired or wireless manner. The second communication device 35 transmits the profile information and the values of the items of state information of the electrical device 2 received from the storage battery pack 1 to the external information device. Furthermore, the second communication device 35 may transmit the profile information and the values of the items of state information of the storage battery pack 1 received from the storage battery pack 1 to the external information device.

Next, a specific example of the information processing system in the present embodiment 1 will be described.

Figure 3:
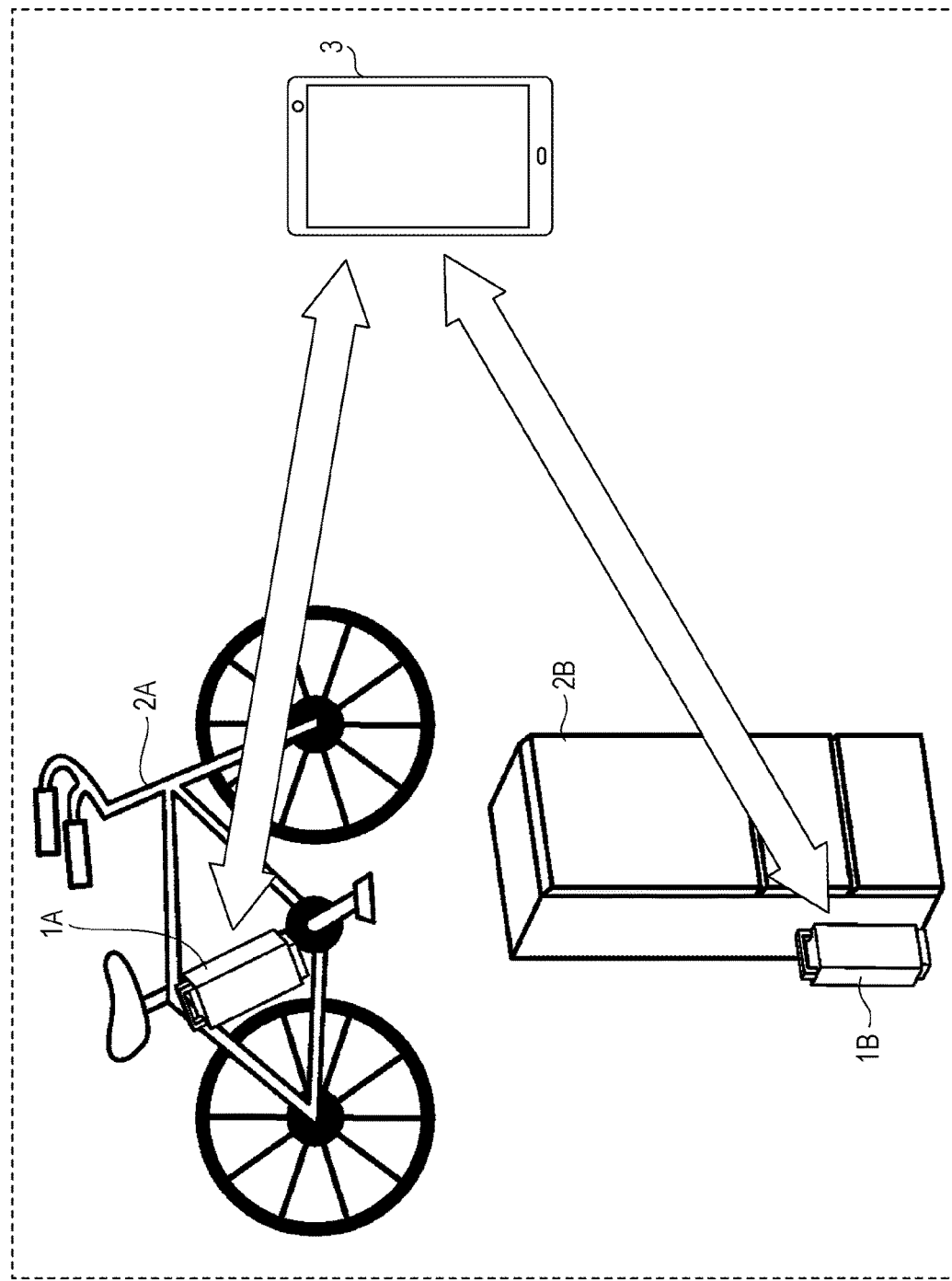
FIG. 3 is a schematic drawing for describing a specific example of the information processing system in embodiment 1.

FIG. 3 is a schematic drawing for describing a specific example of the information processing system in the present embodiment 1.

In FIG. 3, an electrical device 2A is an electric bicycle, an electrical device 2B is a refrigerator, and the information terminal 3 is a smartphone. A storage battery pack 1A is attached to the electrical device 2A, and a storage battery pack 1B is attached to the electrical device 2B.

The storage battery pack 1A transmits profile information of the electrical device 2A to the information terminal 3. The storage battery pack 1B transmits profile information of the electrical device 2B to the information terminal 3.

FIG. 4 is a drawing depicting an example of the profile information of a storage battery pack in the present embodiment 1, and FIG. 5 is a drawing depicting an example of the profile information of an electric bicycle in the present embodiment 1.

As depicted in FIGS. 4 and 5, the profile information includes, for example, an identifier (ID), information indicating the content (items of state information) of the state information of an electrical device, a minimum value, a maximum value, a size, information indicating whether or not reading is possible, information indicating whether or not writing is possible, and information indicating whether or not to provide notification if the value changes. Here, the minimum value, the maximum value, the size, whether or not reading is possible, whether or not writing is possible, and whether or not to provide notification if the value changes are items indicating attributes of the items of state information. In FIG. 4, these items indicating attributes are "minimum value", "maximum value", "size", "read", "write", and "notify".

In the profile information of the storage battery pack depicted in FIG. 4, the content of the state information having the ID "0" is the remaining amount (%) of the secondary battery. The minimum value of the state information is 0 (%), the maximum value of the state information is 100 (%), and the size of the state information is 8 bits. Furthermore, the state information indicates that reading is possible, writing is not possible, and notification is not provided if the value changes. Here, information such as the minimum value being 0 (%), the maximum value being 100 (%), the size being 8 bits, reading being possible, writing not being possible, and notification not being provided if the value changes corresponds to attribute values for items that indicate attributes.

Furthermore, the content of the state information having the ID "1" is constituted by abnormality flags (set of abnormality flags for each bit). The minimum value and the maximum value of the state information are not set. The size of the state information is 32 bits. Furthermore, the state information indicates that reading is possible, writing is not possible, and notification is provided if the value changes.

Furthermore, the content of the state information having the ID "2" is output (W). The minimum value of the state information is 0 (W), the maximum value of the state information is 500 (W), and the size of the state information is 16 bits. Furthermore, the state information indicates that reading is possible, writing is possible, and notification is not provided if the value changes.

It should be noted that the profile information of the storage battery pack depicted in FIG. 4 is an example and is not limited thereto. Furthermore, at least one item indicating an attribute of the state information may be set for the state information included in the profile information.

In the profile information of an electric bicycle depicted in FIG. 5, the content of the state information having the ID "0" is a number of pedal rotations (rpm). The minimum value of the state information is 0 (rpm), the maximum value of the state information is 255 (rpm), and the size of the state information is 8 bits. Furthermore, the state information indicates that reading is possible, writing is not possible, and notification is not provided if the value changes.

The content of the state information having the ID "1" is the total travel distance (km). The minimum value of the state information is 0 (km), the maximum value of the state information is 65535 (km), and the size of the state information is 16 bits. Furthermore, the state information indicates that reading is possible, writing is not possible, and notification is not provided if the value changes.

It should be noted that the profile information of the electric bicycle depicted in FIG. 5 is an example and is not limited thereto. Furthermore, at least one item indicating an attribute of the state information may be set for the state information included in the profile information.

As described above, the storage device 13 stores profile information, in which each of a plurality of electrical devices 2 and items of state information are associated, in a table format. The first communication device 16 receives device identification information from the electrical device 2. The specifying device 14 refers to the profile information and uses the device identification information received by the first communication device 16 to specify profile information corresponding to the electrical device 2 connected to the connection device 15.

Figure 6:
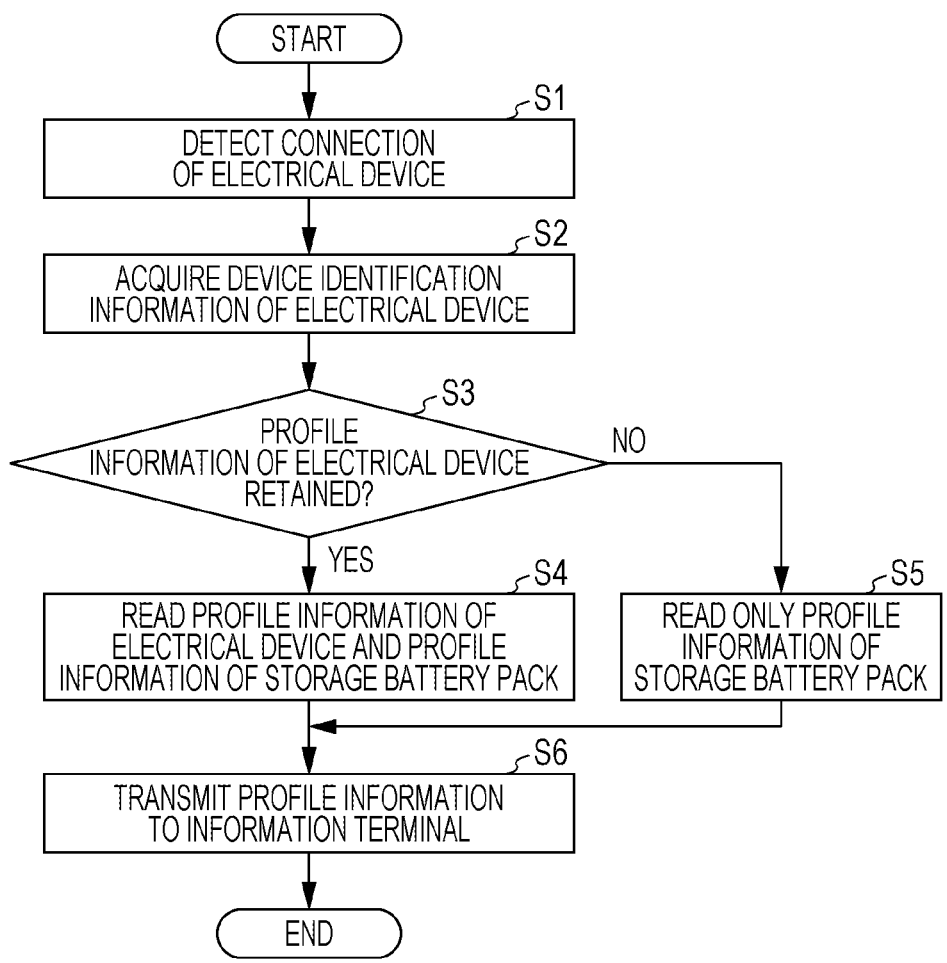
FIG. 6 is a flowchart depicting an operation for transmitting profile information of the information processing system in embodiment 1.

FIG. 6 is a flowchart depicting an operation for transmitting profile information of the information processing system in the present embodiment 1. It should be noted that the processing of FIG. 6 indicates processing in which the storage battery pack 1 transmits profile information to the information terminal 3 of its own accord.

First, in step S1, the control device 12 of the storage battery pack 1 detects that the storage battery pack 1 is attached to the electrical device 2. In other words, the control device 12 electrically or physically detects that the connection device 15 of the storage battery pack 1 and the connection device 21 of the electrical device 2 have made contact. Furthermore, the control device 12 may detect that the storage battery pack 1 has been detached from the electrical device 2. In other words, the control device 12 electrically or physically detects that the connection device 15 of the storage battery pack 1 and the connection device 21 of the electrical device 2 that were in contact have separated.

Next, in step S2, the control device 12 acquires the device identification information of the connected electrical device 2. At such time, the control device 12 issues a request for device identification information to the electrical device 2 via the first communication device 16.

Next, in step S3, the specifying device 14 determines whether or not profile information of the electrical device 2 corresponding to the acquired device identification information is retained in storage device 13. Here, in the case where it is determined that profile information of the electrical device 2 corresponding to the acquired device identification information is retained ("yes" in step S3), in step S4, the specifying device 14 reads the profile information of the electrical device 2 and the profile information of the storage battery pack 1 stored in the storage device 13. The profile information of the electrical device 2 corresponding to the acquired device identification information may be profile information of the electrical device 2 having the same device identification information as the acquired device identification information, for example. In the present embodiment 1, the profile information of the electrical device 2 and the profile information of the storage battery pack 1 are read; however, it should be noted that the present disclosure is not particularly limited thereto, and only the profile information of the electrical device 2 may be read.

On the other hand, in the case where it is determined that profile information of the electrical device 2 corresponding to the acquired device identification information is not retained ("no" in step S3), in step S5, the specifying device 14 reads only the profile information of the storage battery pack 1 stored in the storage device 13.

Next, in step S6, the second communication device 17 transmits the read profile information of the electrical device 2 and the profile information of the storage battery pack 1 to the information terminal 3 in the case where the profile information of the electrical device 2 and the profile information of the storage battery pack 1 have been read in step S4, or transmits only the profile information of the storage battery pack 1 to the information terminal 3 in the case where only the profile information of the storage battery pack 1 has been read in step S5. It should be noted that, subsequent to step S1, when the storage battery pack has received the values of the items of state information from the electrical device, in step S6, the values of the items of state information may also be transmitted together with the profile information to the information terminal 3. Here, the values of the items of state information, when having passed through S4, may include the values of the items of state information of the electrical device 2, and may additionally include the values of the items of state information of the storage battery pack 1. When the values of the items of state information have passed through S5, the values of the items of state information include the values of the items of state information of the storage battery pack 1. Furthermore, the values of the items of state information may be transmitted to the information terminal subsequent to step S6.

In the processing of FIG. 6, the storage battery pack 1 transmits profile information to the information terminal 3 of its own accord; however, it should be noted that the present disclosure is not particularly limited thereto, and the storage battery pack 1 may transmit profile information to the information terminal 3 in response to a request from the information terminal 3.

Figure 7:
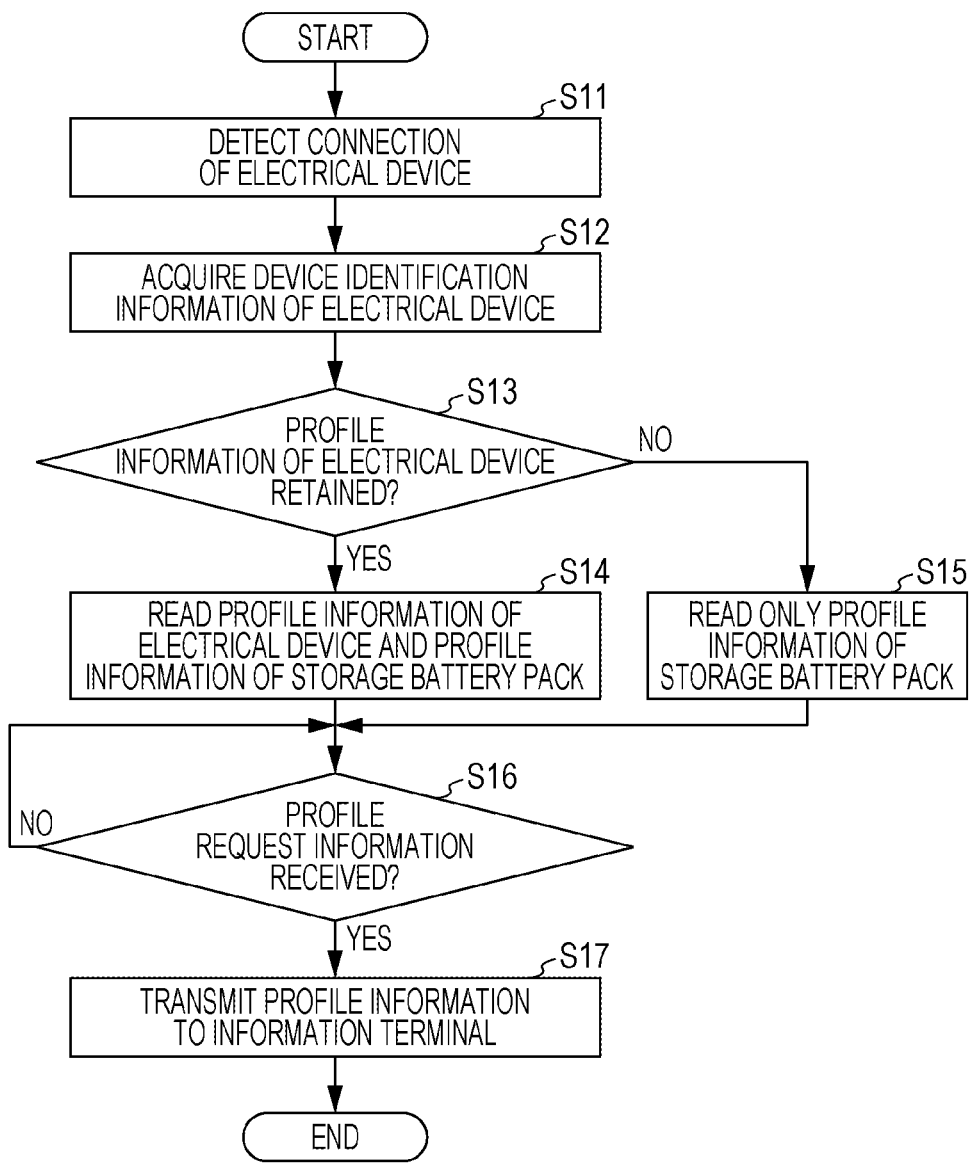
FIG. 7 is a flowchart depicting an operation for transmitting profile information of the information processing system in a modified example of embodiment 1.

FIG. 7 is a flowchart depicting an operation for transmitting profile information of the information processing system in a modified example of the present embodiment 1. It should be noted that the processing of FIG. 7 indicates processing in which the storage battery pack 1 transmits profile information to the information terminal 3 in response to a request from the information terminal 3.

The processing of step S11 to step S15 depicted in FIG. 7 is the same as the processing of step S1 to step S5 depicted in FIG. 6, and a description thereof is therefore omitted.

In step S16, the control device 12 determines whether or not a profile request transmitted by the information terminal 3 has been received. The information terminal 3 receives an instruction to acquire at least one of the profile information of the electrical device 2 and the profile information of the storage battery pack 1, and in response to the received instruction, transmits a profile request that requests at least one of the profile information of the electrical device 2 and the profile information of the storage battery pack 1 to the storage battery pack 1. Here, in the case where it is determined that a profile request has not been received in the storage battery pack 1 ("no" in step S16), a waiting state is entered until a profile request is received. It should be noted that the instruction to acquire at least one of the profile information of the electrical device 2 and the profile information of the storage battery pack 1 may be in any form but, for example, is an instruction operation that activates an application for the user of the information terminal 3 to confirm the values of the items of state information of the electrical device 2. The aforementioned instruction may be an instruction that causes the user of the information terminal 3 to display the electrical device 2 connected to the storage battery pack 1 on the information terminal 3 during activation of the application.

On the other hand, in the case where it is determined that a profile request has been received ("yes" in step S16), in step S17, the second communication device 17 transmits the read profile information of the electrical device 2 and the profile information of the storage battery pack 1 to the information terminal 3 when the profile information of the electrical device 2 and the profile information of the storage battery pack 1 have been read in step S14, or transmits only the profile information of the storage battery pack 1 to the information terminal 3 when only the profile information of the storage battery pack 1 has been read in step S15. It should be noted that, subsequent to step S12, when the storage battery pack has received the values of the items of state information from the electrical device, in step S17, the values of the items of state information may also be transmitted together with the profile information to the information terminal 3. Here, the values of the items of state information, when having passed through S14, may include the values of the items of state information of the electrical device 2, and may additionally include the values of the items of state information of the storage battery pack 1. When the values of the items of state information have passed through S15, the values of the items of state information include the values of the items of state information of the storage battery pack 1. Furthermore, the values of the items of state information may be transmitted to the information terminal subsequent to step S17.

In this way, profile information that is different for each of a plurality of electrical devices 2, including device identification information that identifies the electrical devices 2 and items of state information indicating the states of the electrical devices 2, is stored in the storage battery pack 1, which is connected to an electrical device 2, and profile information corresponding to the connected electrical device from among the plurality of items of profile information is transmitted. Therefore, information of the electrical device 2 can be transmitted to an external information device via the storage battery pack 1 even in the case where the electrical device 2 does not have a function for communicating with the external information device.

It should be noted that the electrical device 2 may transmit the values of the items of state information to the storage battery pack 1 when a value of an item of state information changes or on a regular basis. When the values of the items of state information are received from the electrical device 2, the storage battery pack 1 transmits the received values of the items of state information to the information terminal 3 in association with profile information (in particular, the items of state information). Thus, the most up-to-date state of the electrical device 2 can be notified to the information terminal 3. Alternatively, the electrical device 2 may transmit the values of the items of state information to the storage battery pack 1 in response to a request from the storage battery pack 1. Furthermore, the storage battery pack 1 may transmit the values of the items of state information of the electrical device 2 to the information terminal 3 in association with profile information (in particular, the items of state information) in response to a request from the information terminal 3.

Next, processing for displaying the state information of the electrical device 2 on the information terminal 3 will be described using a screen example.

Figure 8:
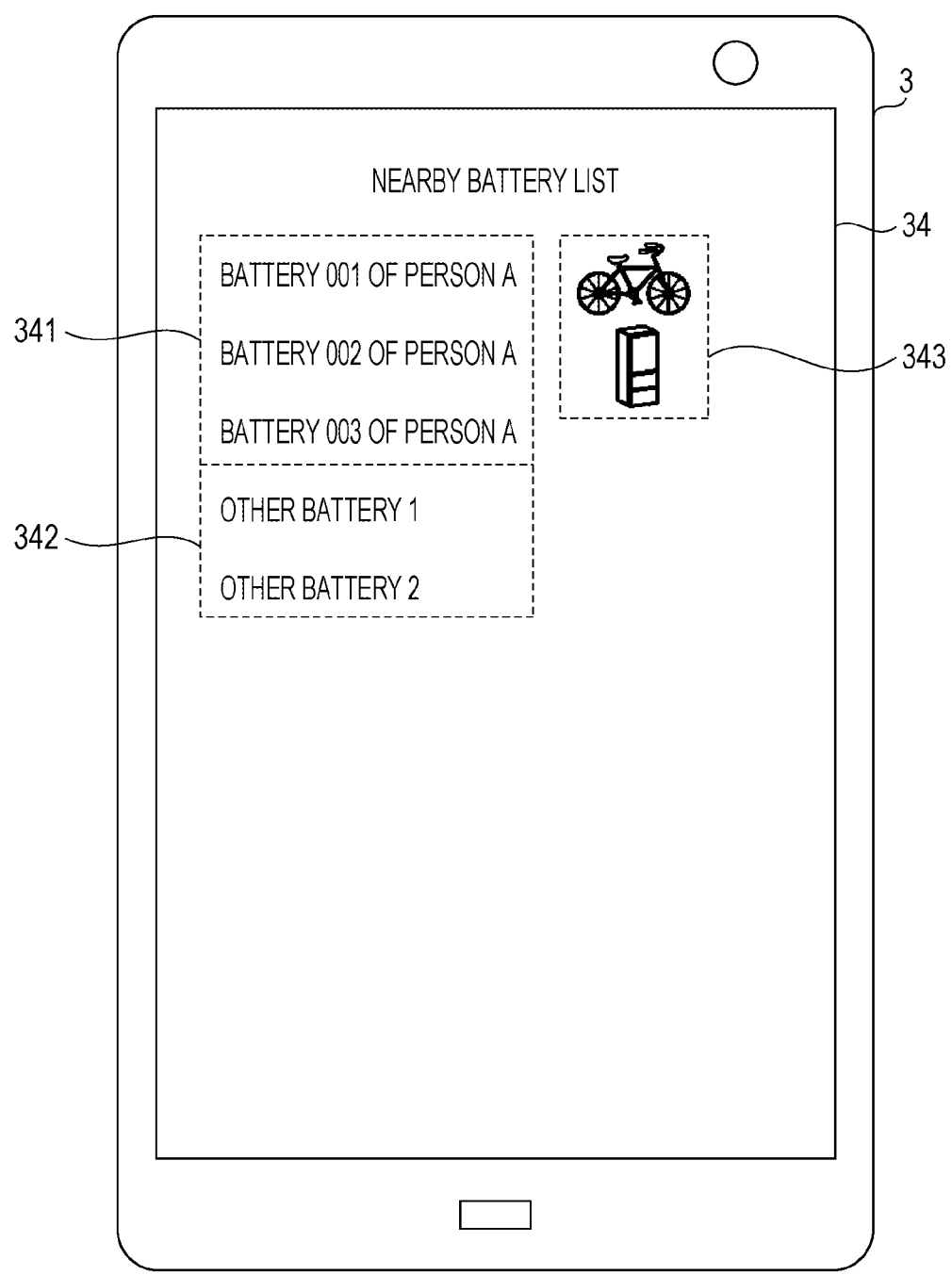
FIG. 8 is a drawing depicting a display screen displayed on a display device of the information terminal in embodiment 1.

FIG. 8 is a drawing depicting a display screen that is displayed on the display device of the information terminal in the present embodiment 1.

The control device 12 of the information terminal 3 searches for storage battery packs that are present in the vicinity of the information terminal 3, and, if storage battery packs are present in the vicinity, displays information indicating the storage battery packs on the display device 34. Here, the vicinity of the information terminal 3 means, in the case where the information terminal 3 and the storage battery packs communicate in a wireless manner, a communication range in which the information terminal 3 and the storage battery packs can communicate in a wireless manner. Furthermore, the information terminal 3 may store, in advance, device identification information that identifies storage battery packs. At such time, the control device 12 may search for storage battery packs that are present in the vicinity of the information terminal 3, and may display, in an identifiable manner, storage battery packs that conform with stored device identification information from among the storage battery packs that are present in the vicinity. Furthermore, the control device 12 may display information indicating storage battery packs stored in advance on the display device 34 without searching for storage battery packs that are present in the vicinity of the information terminal 3.

The control device 12 may associate and display a storage battery pack that is present in the vicinity of the information terminal 3 and an electrical device that is connected to the storage battery pack. Information indicating the storage battery pack and information indicating the electrical device to which the storage battery pack is connected are associated and displayed on a display screen. At such time, the information terminal 3 receives at least the profile information corresponding to the electrical device to which the storage battery pack is connected, from the storage battery pack prior to the aforementioned display operation.

The display device 34 depicted in FIG. 8 displays information 341 that indicates storage battery packs for which device identification information has been stored in the information terminal 3 in advance, information 342 that indicates storage battery packs for which device identification information has not been stored in the information terminal 3 in advance, and information 343 that indicates electrical devices that are connected to the storage battery packs. The information 341, the information 342, and the information 343 may be depicted using text or may be detected using icons. Furthermore, the display device 34 may display an electrical device icon and a storage battery pack icon for a storage battery pack that is connected to an electrical device, and may display only a storage battery pack icon for a storage battery pack that is not connected to an electrical device. In other words, information indicating a storage battery pack that is not connected to an electrical device is displayed on the display screen.

Furthermore, the display device 34 may display a plurality of icons corresponding to items of state information of the profile information of an electrical device on the basis of the profile information of the electrical device received from a storage battery pack. For example, in the case where the profile information of an electric bicycle has a plurality of items of state information such as a number of pedal rotations, a total travel distance, and a heart rate, icons corresponding to each of those items of state information may be displayed.

Furthermore, in the case where a storage battery pack having device identification information that is not stored in the information terminal 3 in advance is present in the vicinity of the information terminal 3, the control device 12 does not have to display information indicating the storage battery pack on the display device 34. In this way, on the display screen, information indicating a storage battery pack that is not registered as a user in the information terminal 3 is displayed, and information indicating an electrical device that is connected to the unregistered storage battery pack is not displayed.

Furthermore, as a result of prescribed information displayed on the display screen being selected, the instruction receiving device 32 receives the second instruction that causes information indicating a storage battery pack to be displayed on the display of the information terminal 3. Here, examples of the prescribed information include an icon for activating an application for executing the aforementioned display control with respect to the display device of the information terminal, and a display button for executing an instruction that causes information, which indicates a storage battery pack and is displayed on the display screen during execution of the application, to be displayed on the display of the information terminal 3. Furthermore, as a result of information that indicates an electrical device and is displayed on the display screen being selected, the instruction receiving device 32 receives the first instruction that causes items of state information indicating the state of the electrical device and the values of the items of state information to be displayed on the display device 34.

Figure 9:
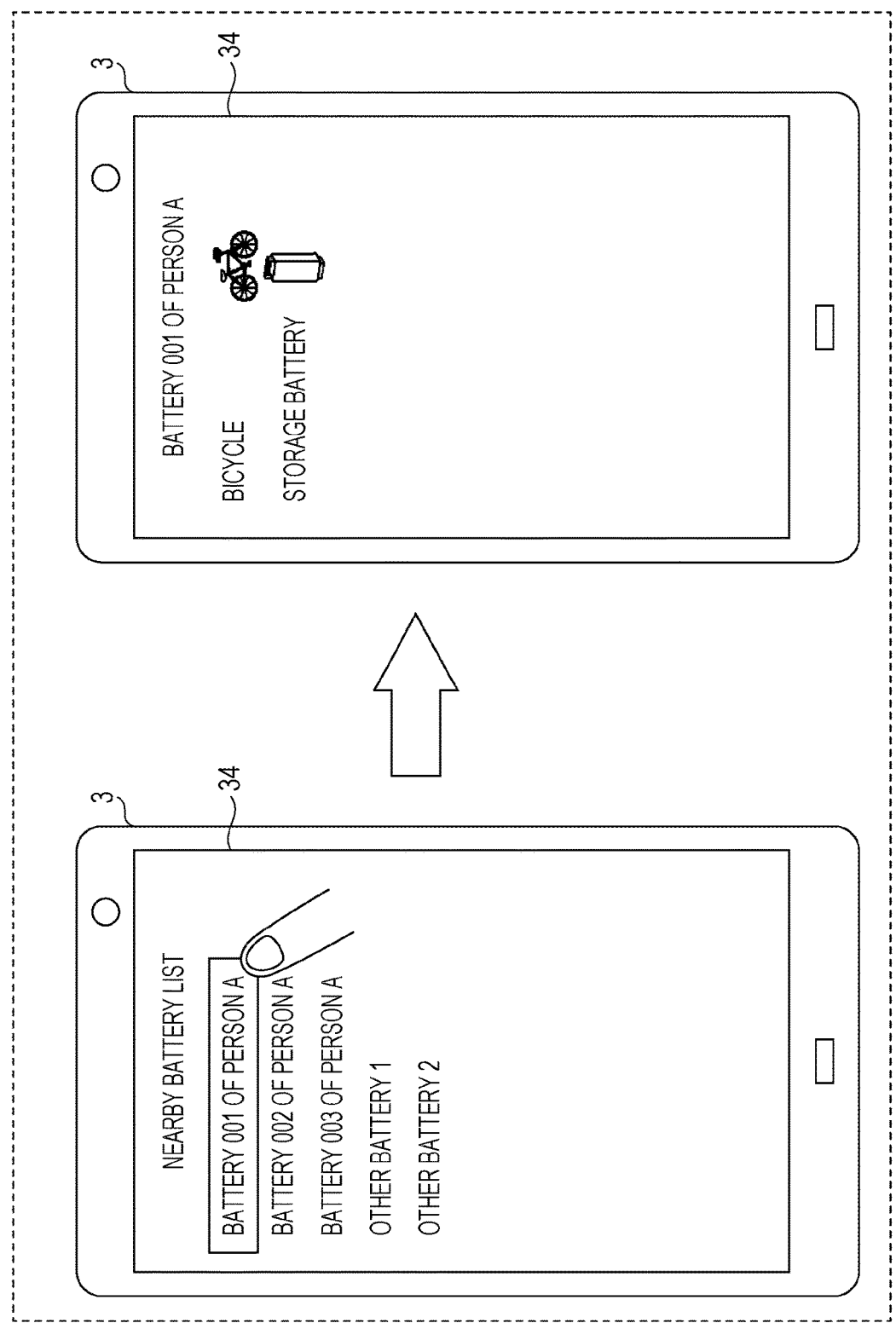
FIG. 9 is a drawing depicting a first modified example of display screens that are displayed on the display device of the information terminal in embodiment 1.

FIG. 9 is a drawing depicting a first modified example of the display screens that are displayed on the display device of the information terminal in the present embodiment 1.

As depicted in FIG. 9, first, the display device 34 lists and displays information indicating storage battery packs that are present in the vicinity of the information terminal 3. In the case where the display device 34 is constituted by a touch panel and information indicating a desired storage battery pack is selected (tapped) by the user, the display device 34 displays information indicating an electrical device to which the storage battery pack is connected and information indicating the storage battery pack. At such time, the information terminal 3 receives at least the profile information corresponding to the electrical device to which the storage battery pack is connected, from the storage battery pack prior to the aforementioned display operation.

In this way, information indicating storage battery packs and information indicating electrical devices may be displayed by switching between different screens.

Figure 10:
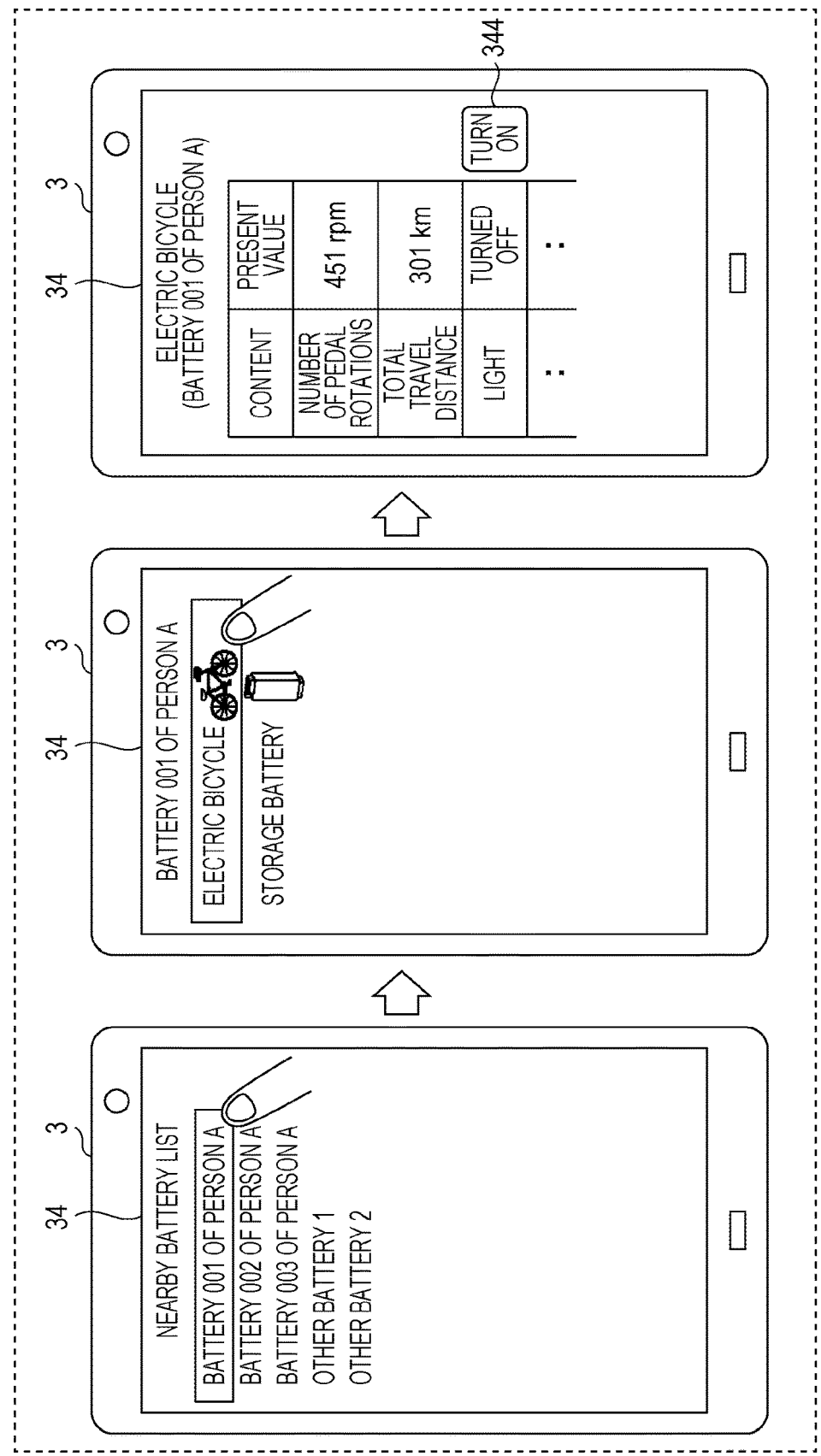
FIG. 10 is a drawing depicting a second modified example of display screens that are displayed on the display device of the information terminal in embodiment 1.

FIG. 10 is a drawing depicting a second modified example of the display screens that are displayed on the display device of the information terminal in the present embodiment 1.

As depicted in FIG. 10, first, the display device 34 lists and displays information indicating storage battery packs that are present in the vicinity of the information terminal 3. In the case where the display device 34 is constituted by a touch panel and information indicating a desired storage battery pack is selected (tapped) by the user, the display device 34 displays information indicating an electrical device to which the storage battery pack is connected and information indicating the storage battery pack. At such time, the information terminal 3 receives at least the profile information corresponding to the electrical device to which the storage battery pack is connected, from the storage battery pack prior to the aforementioned display operation.

In addition, in the case where the information indicating the electrical device is selected (tapped) as the first instruction, the display device 34 displays items of state information of the electrical device and the values of the items of state information. The information terminal 3 may, when the first instruction is executed, receive the values of the items of state information of the electrical device to which the storage battery pack is connected, from the storage battery pack. Alternatively, when information indicating the electrical device to which the storage battery pack is connected is displayed, the information terminal 3 may receive the values of the items of state information of the electrical device together with the profile information corresponding to the electrical device to which the storage battery pack is connected. In FIG. 10, information indicating an electric bicycle is selected (tapped), and items of state information of the electric bicycle and the values of the items of state information are displayed. The items of state information of the electric bicycle include a number of pedal rotations, a total travel distance, and the lit state of a light, for example. The values of the items of state information of the electric bicycle include the present value of the number of pedal rotations, the present value of the total travel distance, and whether or not the light is lit, for example.

Furthermore, the values of the items of state information of the electrical device can be controlled in the aforementioned display screen. For example, a button 344 for changing a value is displayed in association with the item of state information indicating the lit state of the light. When the button 344 is selected (tapped) by the user, the first communication device 31 transmits an instruction to turn on the light to the storage battery pack 1.

In the display screen depicted in FIG. 10, only items of state information of an electric bicycle and the values of the items of state information are displayed; however, it should be noted that the items of state information of the electric bicycle and the values of these items of state information and items of state information of the storage battery pack and the values of these items of state information may be displayed. At such time, the items of state information of the electric bicycle and the values of these items of state information and the items of state information of the storage battery pack and the values of these items of state information may be displayed on the same display screen or may be displayed on different display screens.

Furthermore, the timing at which profile information to be displayed is acquired by the information terminal 3 is not particularly limited. A profile request may be transmitted to the storage battery pack 1 on a regular basis at predetermined timings, or, in the case where information indicating a storage battery pack is displayed, a profile request may be transmitted to the storage battery pack 1.

Next, processing for adding new profile information to the storage battery pack 1 in the present embodiment 1 will be described.

Figure 11:
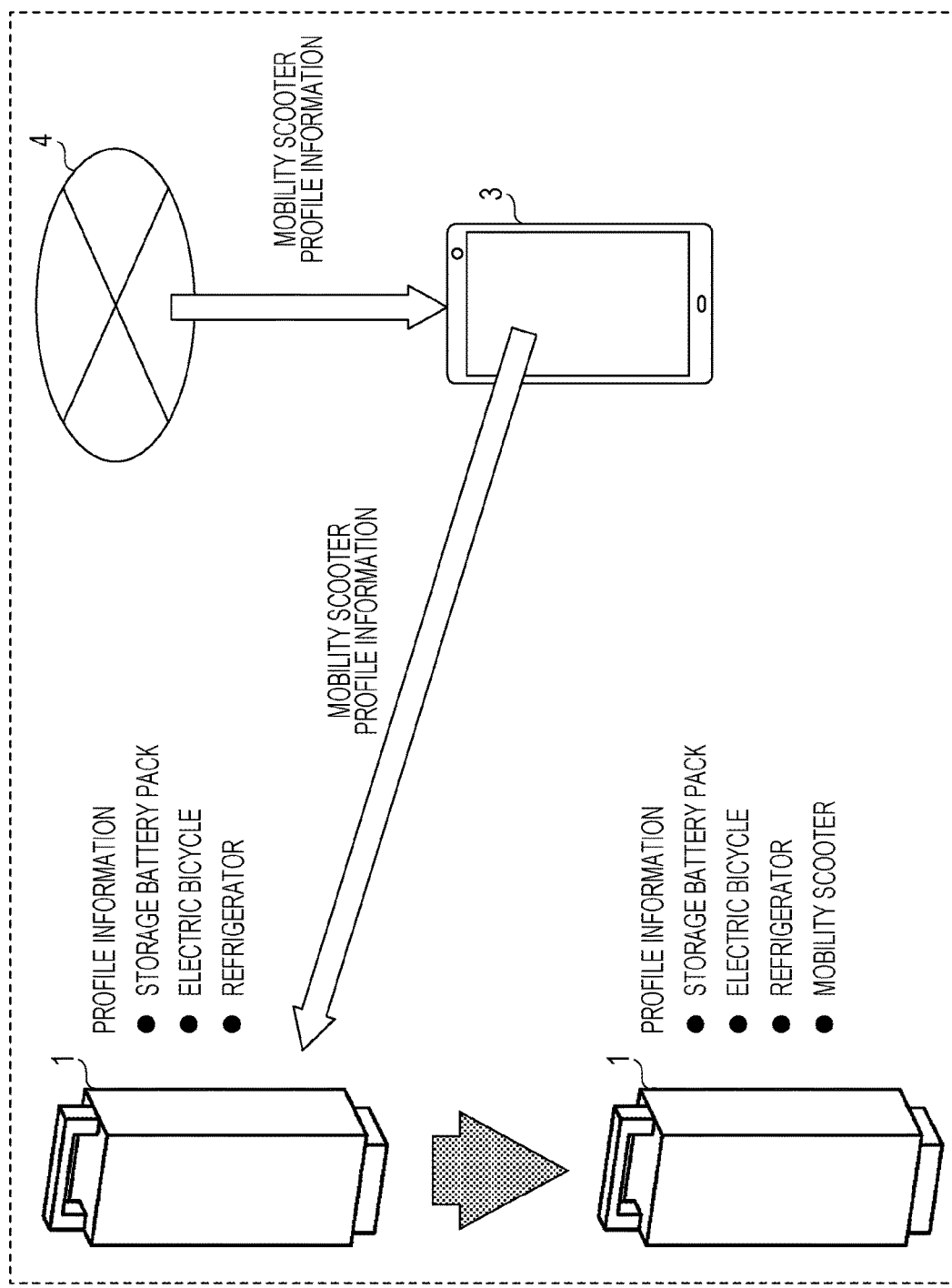
FIG. 11 is a schematic drawing for describing processing for adding new profile information to the storage battery pack in embodiment 1.

FIG. 11 is a schematic drawing for describing processing for adding new profile information to the storage battery pack in the present embodiment 1.

As depicted in FIG. 11, profile information of a storage battery pack, an electric bicycle, and a refrigerator are already stored in the storage battery pack 1. First, the information terminal 3 acquires profile information of a mobility scooter from an external server via the network 4. In the case where new profile information of a mobility scooter is defined, the external server transmits the new profile information of the mobility scooter to the information terminal 3. The information terminal 3 then transmits the acquired profile information of the mobility scooter to the storage battery pack 1. The storage battery pack 1 receives the profile information of the mobility scooter transmitted by the information terminal 3. The storage battery pack 1 stores the received profile information of the mobility scooter. Thus, new profile information is added to the storage battery pack 1. In the present example, the new profile information is added to the storage battery pack via the information terminal 3; however, it should be noted that the new profile information may be added to the storage battery pack directly from the external server via the network 4.

Figure 12:
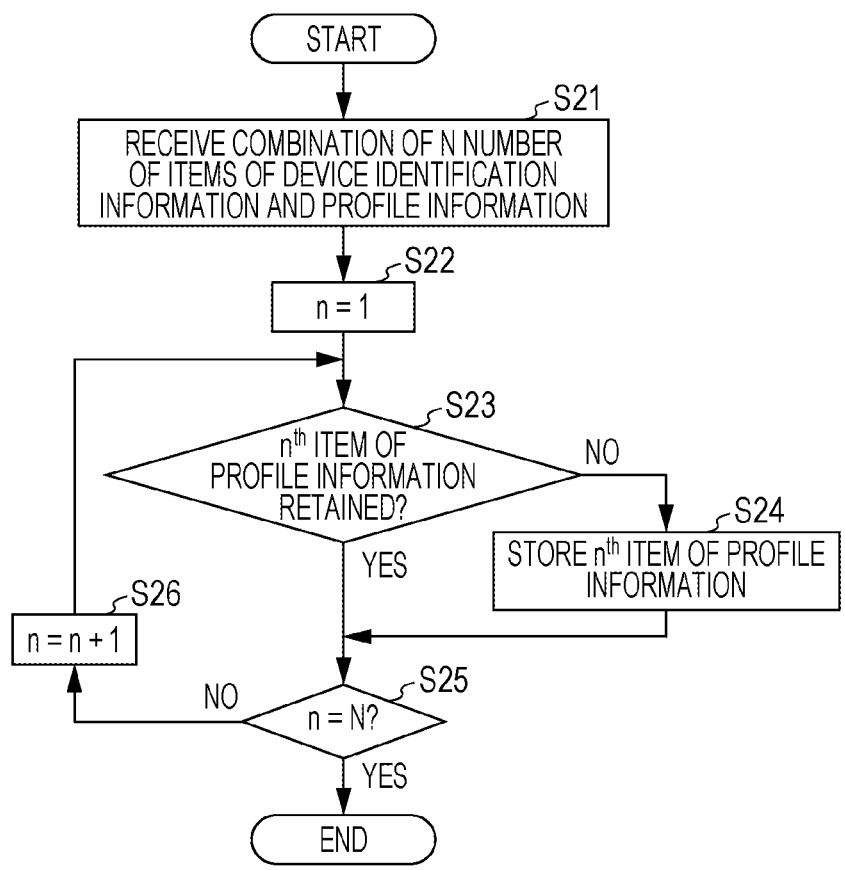
FIG. 12 is a flowchart for describing the processing for adding new profile information to the storage battery pack in embodiment 1.

FIG. 12 is a flowchart for describing the processing for adding new profile information to the storage battery pack in the present embodiment 1.

First, in step S21, the second communication device 17 of the storage battery pack 1 receives a combination of N number (N being a positive integer) of items of device identification information and profile information of electrical devices or storage battery packs transmitted by the information terminal 3.

Next, in step S22, the control device 12 assigns 1 to a variable n. The variable n is a variable indicating the number of items of profile information.

Next, in step S23, the control device 12 determines whether or not an $n^{th}$ item of profile information, from among the received combination of N number of items of device identification information and profile information, is retained in the storage device 13. Here, in the case where it is determined that an $n^{th}$ item of profile information is not retained ("no" in step S23), in step S24, the control device 12 stores an $n^{th}$ item of profile information in the storage device 13.

On the other hand, in the case where it is determined that an $n^{th}$ item of profile information is retained ("yes" in step S23), in step S25, the control device 12 determines whether or not the variable n is equal to N. Here, in the case where it is determined that the variable n is equal to N ("yes" in step S25), processing is terminated.

On the other hand, in the case where it is determined that the variable n is not equal to N ("no" in step S25), in step S26, the control device 12 increments the variable n by 1, and processing returns to step S23. Thereafter, the control device 12 determines whether or not an $n^{th}$ item of profile information is retained in the storage device 13.

Next, processing for adding a portion of profile information to the storage battery pack 1 in the present embodiment 1 will be described.

Figure 13:
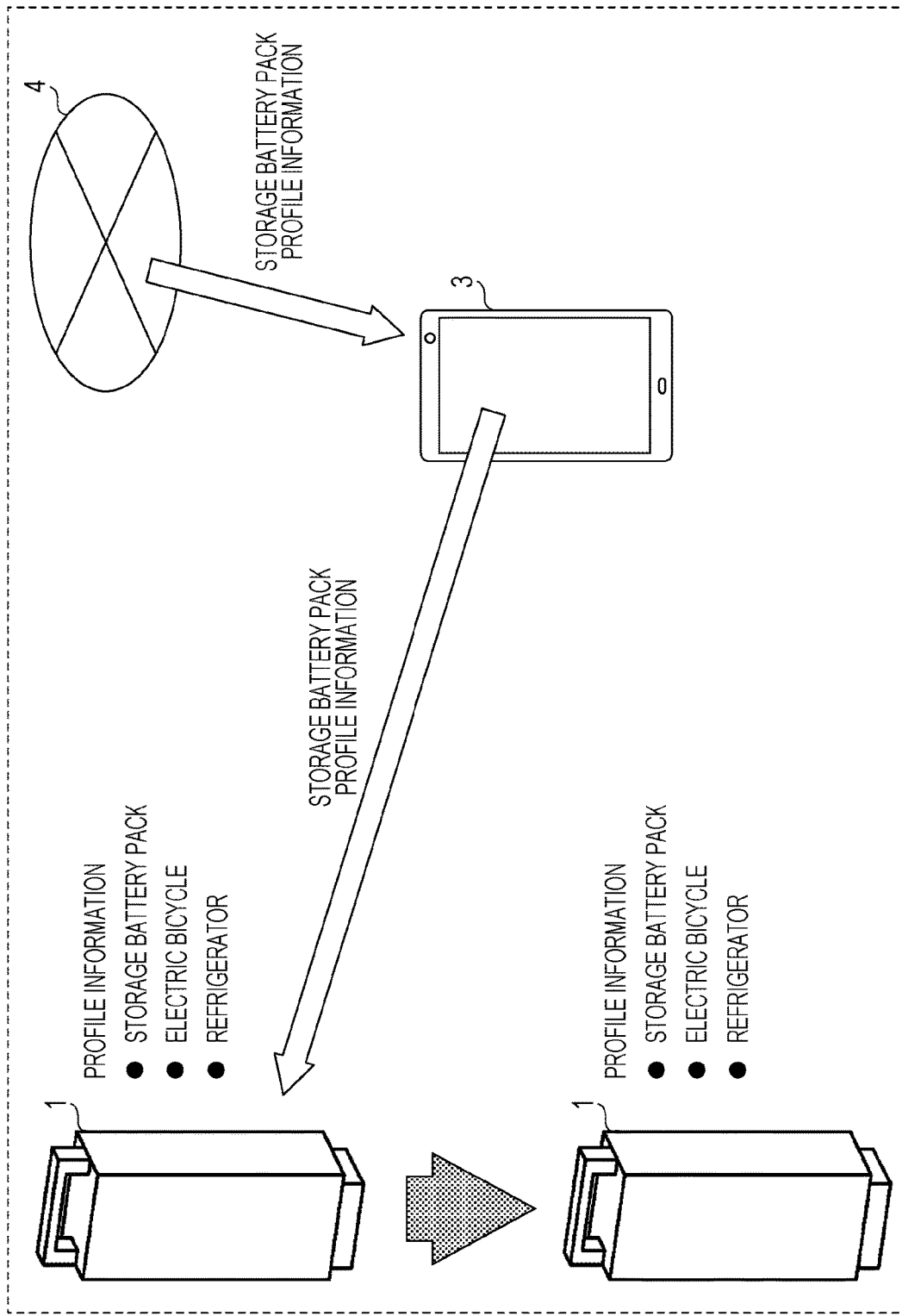
FIG. 13 is a schematic drawing for describing processing for adding a portion of profile information to the storage battery pack in embodiment 1.

FIG. 13 is a schematic drawing for describing processing for adding a portion of profile information to the storage battery pack in the present embodiment 1.

As depicted in FIG. 13, profile information of a storage battery pack, an electric bicycle, and a refrigerator are already stored in the storage battery pack 1. First, the information terminal 3 acquires profile information of a storage battery pack from an external server via the network 4. In the case where new profile information of a storage battery pack is defined, the external server transmits the new profile information of the storage battery pack to the information terminal 3. The information terminal 3 then transmits the acquired profile information of the storage battery pack to the storage battery pack 1. The storage battery pack 1 receives the profile information of the storage battery pack transmitted by the information terminal 3. The storage battery pack 1 compares the received profile information of the storage battery pack and the profile information of the storage battery pack that is already stored, and from among the items of state information of the received profile information, stores items of state information that are not included in the profile information that is already stored. Thus, a portion of the profile information is added to the storage battery pack 1. In the present example, a new portion of profile information is added to the storage battery pack via the information terminal 3; however, it should be noted that the new portion of profile information may be added to the storage battery pack directly from the external server via the network 4.

FIG. 14 is a drawing depicting an example of the profile information of a storage battery pack that is stored in the storage battery pack, and FIG. 15 is a drawing depicting an example of the profile information of the storage battery pack to which a new item of state information has been added.

As depicted in FIG. 14, the profile information of the storage battery pack 1 includes the three items of state information of "remaining amount", "abnormality flags", and "output". Here, in the case where the profile information of the storage battery pack is updated and a "total capacity" item of state information is added, the information terminal 3 transmits the new profile information of the storage battery pack, which is acquired from the external server, to the storage battery pack 1. When the storage battery pack 1 receives the new profile information of the storage battery pack, the storage battery pack 1 compares the received profile information of the storage battery pack and the profile information of the storage battery pack that is already stored. At such time, the "total capacity" item of state information is not included in the profile information that is already stored, and therefore the storage battery pack 1 adds the "total capacity" item of state information to the profile information. Thus, as depicted in FIG. 15, the profile information of the storage battery pack 1 comes to include the four items of state information of "remaining amount", "abnormality flags", "output", and "total capacity".

Figure 16:
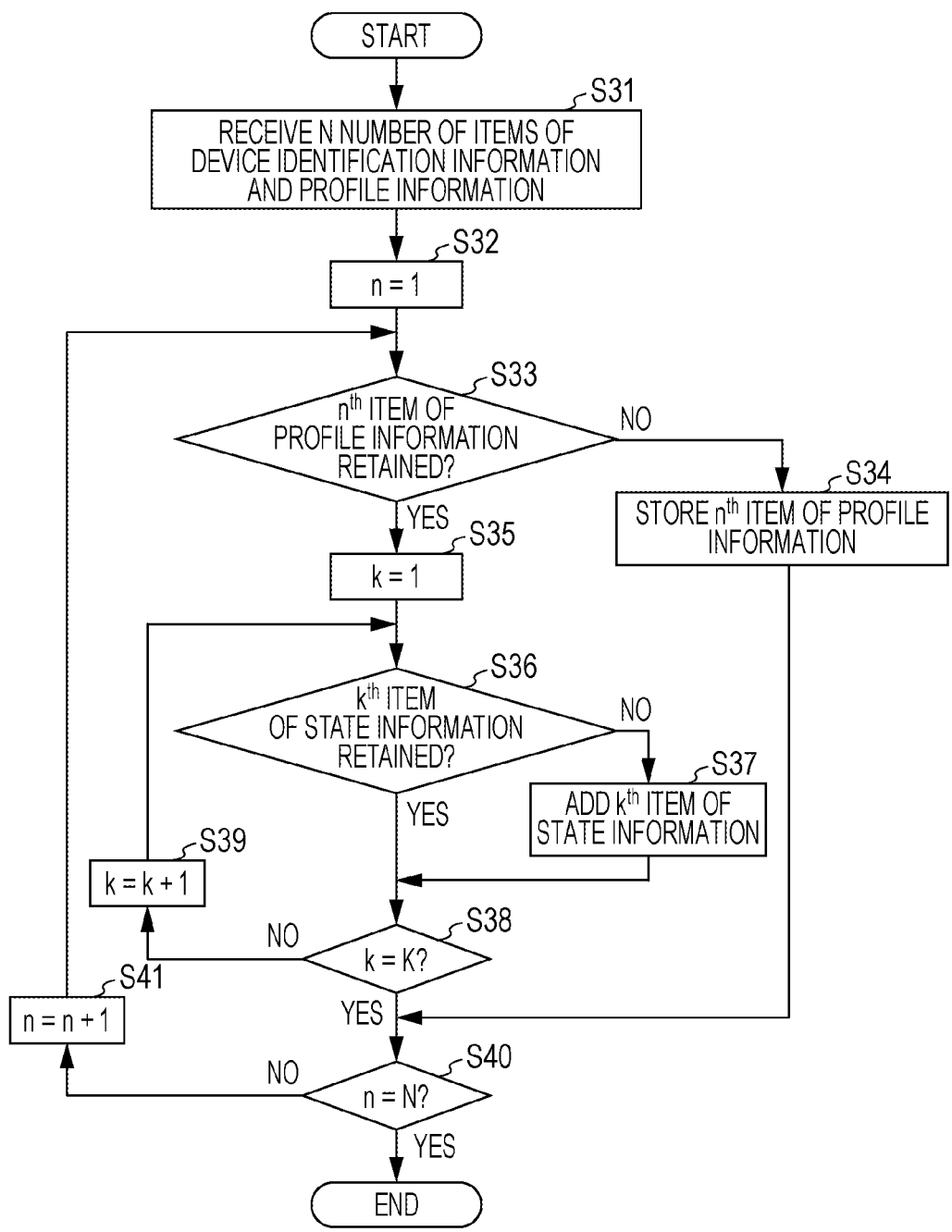
FIG. 16 is a flowchart for describing the processing for adding a portion of profile information to the storage battery pack in embodiment 1.

FIG. 16 is a flowchart for describing the processing for adding a portion of profile information to the storage battery pack in the present embodiment 1.

First, in step S31, the second communication device 17 of the storage battery pack 1 receives a combination of N number (N being a positive integer) of items of device identification information and profile information of electrical devices or storage battery packs transmitted by the information terminal 3.

Next, in step S32, the control device 12 assigns 1 to the variable n. The variable n is a variable indicating the number of items of profile information.

Next, in step S33, the control device 12 determines whether or not an $n^{th}$ item of profile information, from among the received combination of N number of items of device identification information and profile information, is retained in the storage device 13. Here, in the case where it is determined that an $n^{th}$ item of profile information is not retained ("no" in step S33), in step S34, the control device 12 stores an $n^{th}$ item of profile information in the storage device 13, and processing transitions to step S40.

On the other hand, in the case where it is determined that an $n^{th}$ item of profile information is retained ("yes" in step S33), in step S35, the control device 12 assigns 1 to a variable k. The variable k is a variable indicating the number of items of state information included in the profile information. The profile information includes K number (K being a positive integer) of items of state information.

Next, in step S36, the control device 12 determines whether or not a $k^{th}$ item of state information, from among the items of state information that make up the received $n^{th}$ item of profile information, is retained in the storage device 13. Here, in the case where it is determined that a $k^{th}$ item of state information is not retained ("no" in step S36), in step S37, the control device 12 adds a $k^{th}$ item of state information to the $n^{th}$ item of profile information.

On the other hand, in the case where it is determined that a $k^{th}$ item of state information is retained ("yes" in step S36), in step S38, the control device 12 determines whether or not the variable k is equal to K. Here, in the case where it is determined that the variable k is not equal to K ("no" in step S38), in step S39, the control device 12 increments the variable k by 1, and processing returns to step S36. Thereafter, the control device 12 determines whether or not a $k^{th}$ item of state information is retained in the storage device 13.

On the other hand, in the case where it is determined that the variable k is equal to K ("yes" in step S38), in step S40, the control device 12 determines whether or not the variable n is equal to N. Here, in the case where it is determined that the variable n is equal to N ("yes" in step S40), processing is terminated.

On the other hand, in the case where it is determined that the variable n is not equal to N ("no" in step S40), in step S41, the control device 12 increments the variable n by 1, and processing returns to step S33. Thereafter, the control device 12 determines whether or not an $n^{th}$ item of profile information is retained in the storage device 13.

(Embodiment 2)

In embodiment 1, the information terminal 3 is connected to the external network 4, and the storage battery pack 1 is not connected to the external network 4. In contrast, in embodiment 2, the storage battery pack 1 is communicably connected to the external network 4.

Figure 17:
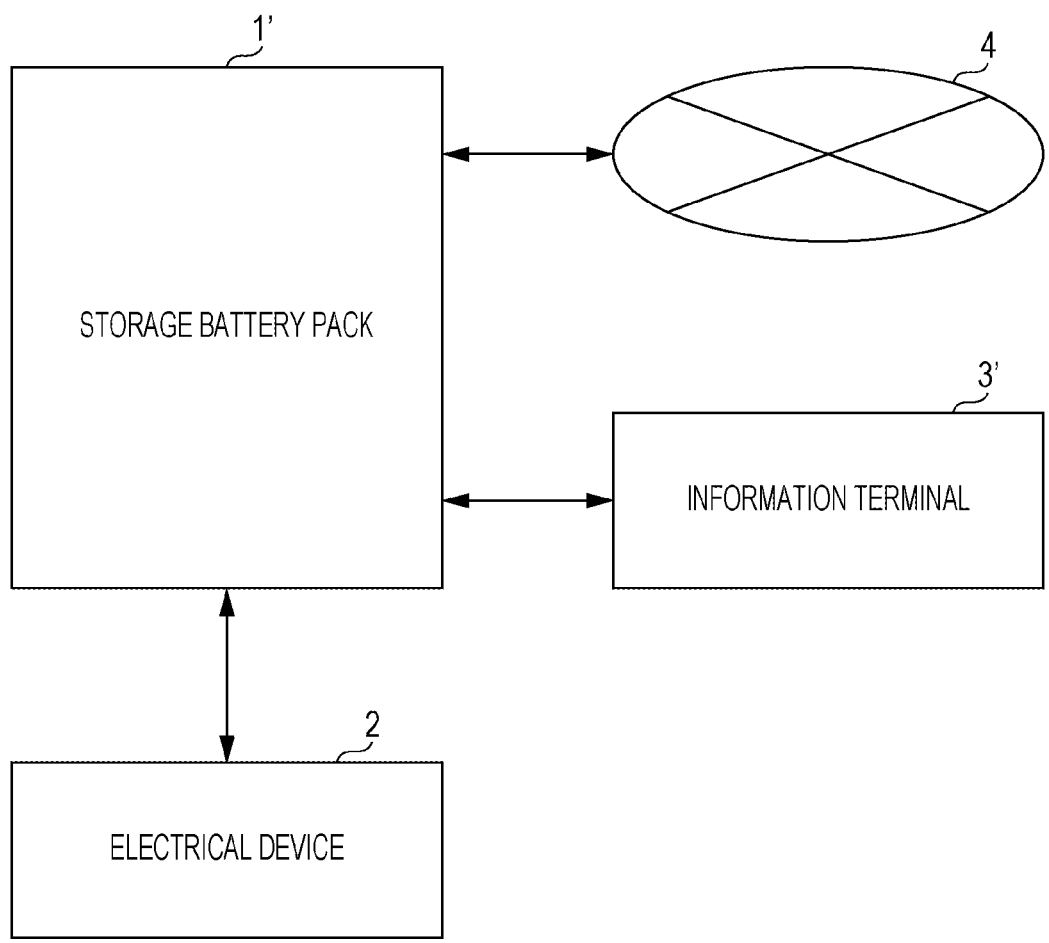
FIG. 17 is a drawing depicting a configuration of an information processing system in embodiment 2.

FIG. 17 is a drawing depicting a configuration of the information processing system in the present embodiment 2. The information processing system depicted in FIG. 17 is provided with a storage battery pack 1', an electrical device 2, and an information terminal 3'. It should be noted that, in the present embodiment 2, configurations that are the same as in embodiment 1 are denoted by the same reference numbers and descriptions thereof are omitted.

The storage battery pack 1' can be connected to a plurality of different types of electrical devices 2, and supplies power to a connected electrical device 2. Furthermore, the storage battery pack 1' is connected to an external information device such as a server via an external network 4 such as a cellular phone communication network or the Internet.

The information terminal 3' is a smartphone, a personal computer, a tablet computer, a cellular phone, or the like. The information terminal 3' is connected to the storage battery pack 1' via a wireless local area network (LAN), short-distance wireless communication (near field communication), or Bluetooth, for example. It should be noted that the information terminal 3' may be connected in a wired manner to the storage battery pack 1'.

Furthermore, in the present embodiment 2, the information terminal 3' is not connected to the external network 4; however, the present disclosure is not particularly limited thereto, and the information terminal 3' may also be connected to the external network 4.

FIG. 18 is a block diagram depicting a configuration of the storage battery pack, the electrical device, and the information terminal in the present embodiment 2.

The storage battery pack 1' depicted in FIG. 18 is provided with a secondary battery 11, a control device 12, a storage device 13, a specifying device 14, a connection device 15, a first communication device 16, a second communication device 17, and a third communication device 18. The storage battery pack 1' depicted in FIG. 18 is different from the storage battery pack 1 depicted in FIG. 2 in being provided with the third communication device 18. The third communication device 18 is an example of a third communication device of the present disclosure.

The third communication device 18 communicates with an external information device (not depicted) such as a server via the external network 4. The third communication device 18 communicates with the external information device in a wired or wireless manner. The third communication device 18 transmits the profile information of the electrical device 2 stored in the storage battery pack 1' to the external information device. Furthermore, the third communication device 18 may transmit the profile information of the storage battery pack 1' stored in the storage battery pack 1' to the external information device such as a server. Furthermore, the third communication device 18 may transmit the values of items of state information of the electrical device 2 stored in the storage battery pack 1' to the external information device. It should be noted that the third communication device 18 may also be used for the second communication device.

Furthermore, the third communication device 18 may receive new profile information of the electrical device or the storage battery pack from the external information device via the external network 4.

The information terminal 3' depicted in FIG. 18 is provided with a first communication device 31, an instruction receiving device 32, a control device 33, and a display device 34. The information terminal 3' depicted in FIG. 18 is different from the information terminal 3 depicted in FIG. 2 in not being provided with the second communication device 35.

It should be noted that the operation for transmitting profile information of the information processing system in the present embodiment 2 is the same as the operation for transmitting profile information of the information processing system in embodiment 1.

Next, processing for adding new profile information to the storage battery pack 1' in the present embodiment 2 will be described.

FIG. 19 is a schematic drawing for describing the processing for adding new profile information to the storage battery pack in the present embodiment 2. In embodiment 1, the storage battery pack 1 receives new profile information via the information terminal 3; however, in embodiment 2, the storage battery pack 1' receives new profile information directly from the external information device without the information terminal 3' being interposed.

As depicted in FIG. 19, profile information of a storage battery pack, an electric bicycle, and a refrigerator are already stored in the storage battery pack 1'. First, the storage battery pack 1' acquires profile information of a mobility scooter from an external server via the network 4. In the case where new profile information of a mobility scooter is defined, the external server transmits the new profile information of the mobility scooter to the storage battery pack 1'. The storage battery pack 1' receives the profile information of the mobility scooter transmitted by the external server. The storage battery pack 1' stores the received profile information of the mobility scooter. Thus, new profile information is added to the storage battery pack 1'. It should be noted that, in a modified example of the present embodiment, the information terminal 3' may be provided with the second communication device 35, and the information terminal 3' may acquire the profile information of an electrical device and the values of items of state information of the electrical device retained in an external information device such as a server, from the external information device without the storage battery pack being interposed, and may display such on a display on the basis of this acquired information. At such time, the information terminal 3' may acquire the profile information of the storage battery pack and the values of the items of state information of the storage battery pack retained in an external information device such as a server, from the external information device without the storage battery pack being interposed, and may display such on a display on the basis of this acquired information. Furthermore, in the present modified example, the information terminal 3' may or may not be provided with the first communication device 31.

With a storage battery pack and a method for controlling a storage battery pack according to the present disclosure, it is possible to transmit information of an electrical device to an external information device via the storage battery pack even in the case where the electrical device does not have a function for communicating with the external information device.

What is claimed is:

1. A method of controlling a storage battery pack over a network by a processor of an information terminal, the method comprising:
    communicating, by the information terminal, with the storage battery pack that is connected to an electrical device, without communicating with the electrical device, the electrical device being connected to the storage battery pack to receive power from the storage battery pack;
    receiving, directly from a storage battery pack by the information terminal, profile information of the electrical device connected to the storage battery pack to receive power, the profile information being stored in the storage battery pack and including device identification information of the electrical device and a name of an operational state of the electrical device;
    receiving, directly from the storage battery pack by the information terminal, a value of the operational state of the electrical device connected to the storage battery pack to receive power; and,
    when a first instruction that causes the name of operational state and the value of the operational state to be displayed on a display of the information terminal is received from a user, displaying, on the display of the information terminal, a first display image that depicts the name of operational state and the value of the operational state by using the received profile information and the received value of the name of operational state.

2. The method according to claim 1,
    wherein, when a second instruction that causes information on the storage battery pack to be displayed on the display of the information terminal is received from a user, a second display image that depicts the information on the storage battery pack is displayed on the display of the information terminal.

3. The method according to claim 2,
    wherein the information on the storage battery pack and information on the electrical device to which the storage battery pack is connected are associated with each other and displayed on the second display image.

4. The method according to claim 3,
    wherein information on a storage battery pack that is not connected to an electrical device is displayed on the second display image.

5. The method according to claim 3,
    wherein, on the second display image, information on a storage battery pack that is not registered as a user in the information terminal is displayed, and information on an electrical device that is connected to the unregistered storage battery pack is not displayed.

6. The method according to claim 3,
    wherein the first instruction is received as a result of a selection of the information on the electrical device displayed on the second display image.

7. The method according to claim 1, further comprising:
    receiving a selection of the electrical device to be operated, and
    upon receiving, from a user, a second instruction that instructs the selected electrical device to perform an operation that changes the value of the operational state of the selected electrical device, transmitting the second instruction to the storage battery pack to which the electrical device is connected.

8. The method according to claim 1, further comprising:
    communicating, by the information terminal, with an unconnected storage battery pack, which is not connected to an electrical device;
    receiving, from the unconnected storage battery pack by the information terminal, battery profile information of the unconnected storage battery pack, without the profile information of the electrical device, the battery profile information including a battery identification information of the unconnected storage battery pack, and an operational state of the unconnected storage battery pack;
    displaying a second display image that depicts the information on the storage battery pack connected to the electrical device and information on the unconnected storage battery pack that is not connected to the electrical device, such that the storage battery pack connected to the electrical device and the unconnected storage battery pack are distinguishable.

9. The method according to claim 8, wherein
    the information on the storage battery pack includes a first battery icon indicating the storage battery pack and a device icon indicating the electrical device connected to the storage battery pack, the second battery icon and the device icon being associated with each other, and
    the information on the unconnected storage battery pack includes a second battery icon of the unconnected storage battery pack, without being associated with an icon indicating the electrical device.

10. The method according to claim 1, wherein the electrical device is a device selected from a group comprising a refrigerator, a vacuum cleaner, and an electric bicycle.

11. The method according to claim 8, wherein the operational state of the electrical device is selected from a group comprising: a number of rotations, a number of revolutions per minute (rpm), a travel distance, and lighting on/off conditions.

* * * * *